(12) United States Patent
Yamaguchi et al.

(10) Patent No.: US 7,299,905 B2
(45) Date of Patent: Nov. 27, 2007

(54) ELECTRIC DISC BRAKE APPARATUS

(75) Inventors: Tohma Yamaguchi, Tokyo-to (JP); Takeshi Yamamura, Iwata (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/778,616

(22) Filed: Feb. 13, 2004

(65) Prior Publication Data
US 2004/0212249 A1 Oct. 28, 2004

(30) Foreign Application Priority Data
Apr. 28, 2003 (JP) .............................. 2003-123989

(51) Int. Cl.
*F16D 65/36* (2006.01)
(52) U.S. Cl. ...................... 188/156; 188/162
(58) Field of Classification Search ........ 188/72.7–72.9, 188/156–164; 303/20
See application file for complete search history.

(56) References Cited

U.S. PATENT DOCUMENTS

| | | | | |
|---|---|---|---|---|
| 4,561,527 | A * | 12/1985 | Nakamoto et al. ........ | 192/219.4 |
| 4,658,939 | A * | 4/1987 | Kircher et al. ............. | 188/156 |
| 5,090,518 | A * | 2/1992 | Schenk et al. ............. | 188/72.1 |
| 5,957,246 | A * | 9/1999 | Suzuki ...................... | 188/72.1 |
| 6,139,117 | A * | 10/2000 | Shirai et al. ................ | 303/3 |
| 6,158,822 | A * | 12/2000 | Shirai et al. ................ | 303/3 |
| 6,199,670 | B1* | 3/2001 | Shirai et al. ............... | 188/158 |
| 6,227,626 | B1* | 5/2001 | Blattert ...................... | 303/20 |
| 6,267,207 | B1* | 7/2001 | Fleischer et al. ........... | 188/162 |
| 6,293,370 | B1* | 9/2001 | McCann et al. ........... | 188/71.8 |
| 6,305,511 | B1* | 10/2001 | McCann et al. ............ | 188/265 |
| 6,315,092 | B1* | 11/2001 | Schwarz ..................... | 188/265 |
| 6,325,182 | B1* | 12/2001 | Yamaguchi et al. ....... | 188/72.8 |
| 6,349,801 | B1* | 2/2002 | Koth et al. ................. | 188/72.8 |
| 6,374,958 | B1* | 4/2002 | Usui et al. .................. | 188/72.7 |
| 6,425,643 | B2* | 7/2002 | Shirai et al. ................ | 303/112 |
| 6,471,015 | B1* | 10/2002 | Ralea et al. ............. | 188/1.11 L |
| 6,491,140 | B2* | 12/2002 | Usui et al. .................. | 188/72.1 |
| 6,571,921 | B2* | 6/2003 | Ohtani et al. .............. | 188/72.1 |
| 6,626,270 | B2* | 9/2003 | Drennen et al. ........... | 188/72.8 |
| 2002/0185340 | A1* | 12/2002 | Kojima ...................... | 188/72.8 |
| 2003/0066719 | A1* | 4/2003 | Watanabe et al. .......... | 188/72.7 |
| 2004/0201270 | A1* | 10/2004 | Suzuki et al. ................ | 303/20 |

* cited by examiner

*Primary Examiner*—Christopher P. Schwartz
(74) *Attorney, Agent, or Firm*—Brinks Hofer Gilson & Lione

(57) ABSTRACT

An object of the present invention is to provide an electric disc brake apparatus having a simple constitution in which the operating condition of a parking brake can be reliably detected. A controller detects the operating condition (steps S25, S26) of a solenoid for driving a parking brake locking mechanism (holding mechanism) by means of a motor current (step S24). As a result, a state in which thrust generated by the motor (first electric actuator) is maintained by the parking brake locking mechanism, and accordingly the operative and inoperative states of the parking brake can be understood easily. Further, detection of the motor current is performed using a current sensor that is also used to realize a function of the motor (a function for moving brake pads toward a disc rotor), and hence separate current detection means need not be provided. Accordingly, the operative or inoperative state of the parking brake can be understood by means of a simple constitution, enabling a reduction in the cost of the apparatus.

13 Claims, 22 Drawing Sheets

ELECTRIC DISC BRAKE APPARATUS

BACKGROUND

1. Field of the Invention

The present invention relates to an electric disc brake apparatus for producing braking force using the torque of a motor, and more particularly to an electric disc brake apparatus with an added function as a parking brake.

2. Description of the Related Art

There are currently electric disc brake apparatuses with a caliper comprising a piston, a motor, and a rotation-linear movement conversion mechanism for converting the rotation of the motor into linear movement and transmitting this linear movement to the piston. In such an electric disc brake apparatus, the piston is moved in accordance with the rotation of a rotor of the motor, whereby a brake pad is pressed against a disc rotor to produce braking force. Further, such an electric disc brake apparatus normally has a sensor for detecting the pressing force or stroke of a brake pedal depressed by an operator, and controls the rotation (rotational angle) of the electric motor in accordance with the detected value to thereby obtain the desired braking force.

In recent times, various attempts have been made to enhance the utility value of this type of electric disc brake apparatus by adding a parking brake function thereto.

In order to use an electric disc brake, which possesses reversibility against the reactive force from the brake pad, as a parking brake, the piston must be fixed by some type of means.

For example, in the electric caliper which converts the rotational motion of the motor into linear movement, the rotor of the motor is locked by a solenoid actuator (to be referred to as "solenoid" below). To use the apparatus as a parking brake, the solenoid must be locked into a non-energized state, and for this purpose (1) a mechanism which sets the solenoid in an energized state such that the lock is released during normal braking, and sets the solenoid in a non-energized state such that the lock is activated during parking braking, (2) a mechanism which uses a solenoid comprising a latch mechanism such that during normal braking, the solenoid is moved in a releasing direction and thus set in a momentary energized state such that the lock is released, and during parking braking, the solenoid is moved in a locking direction and thus set in a momentary energized state such that the lock is activated, and so on are used.

An example of an electric disc brake apparatus having a parking brake function as described above is illustrated in U.S. Unexamined Patent Application Publication US2003/0066719A1 (or the corresponding German Unexamined Patent Application Publication (Offenlegungsschrift) DE10233673A1).

It is desirable to understand clearly when the parking brake is operative and when it is inoperative. In the prior art described above, however, it is difficult to know when the parking brake is operative, and hence the apparatus in the prior art cannot satisfy this requirement suitably.

SUMMARY OF THE INVENTION

The present invention has been designed in consideration of these circumstances, and it is an object thereof to provide an electric disc brake apparatus having a simple constitution in which the operating condition of a parking brake can be reliably detected.

The present invention is an electric disc brake apparatus having a caliper comprising a first electric actuator for moving a pair of brake pads opposing each other on either side of a disc rotor toward the disc rotor, a holding mechanism for maintaining thrust generated by the first electric actuator, and a second electric actuator for driving the holding mechanism, wherein operating condition detection means are provided for detecting the operating condition of the holding mechanism in accordance with the second electric actuator by means of a current value of the first electric actuator.

Further, the present invention is an electric disc brake apparatus having a caliper comprising a piston for pushing a pair of brake pads opposing each other on either side of a disc rotor toward the disc rotor, a motor for moving the piston via a rotation-linear movement conversion mechanism, a claw wheel provided on a rotor of the motor, an engaging claw disposed on the outer periphery of the claw wheel so as to be capable of engaging with and separating from the claw wheel, and an actuator for causing the engaging claw to engage with and separate from the claw wheel, wherein operating condition detection means are provided to detect the operating condition of the engaging claw in accordance with the actuator by means of a current value of the motor.

DETAILED DESCRIPTION OF THE DRAWINGS AND THE PRESENTLY PREFERRED EMBODIMENTS

An embodiment of the present invention will be described in detail below on the basis of the drawings.

Figure 5:
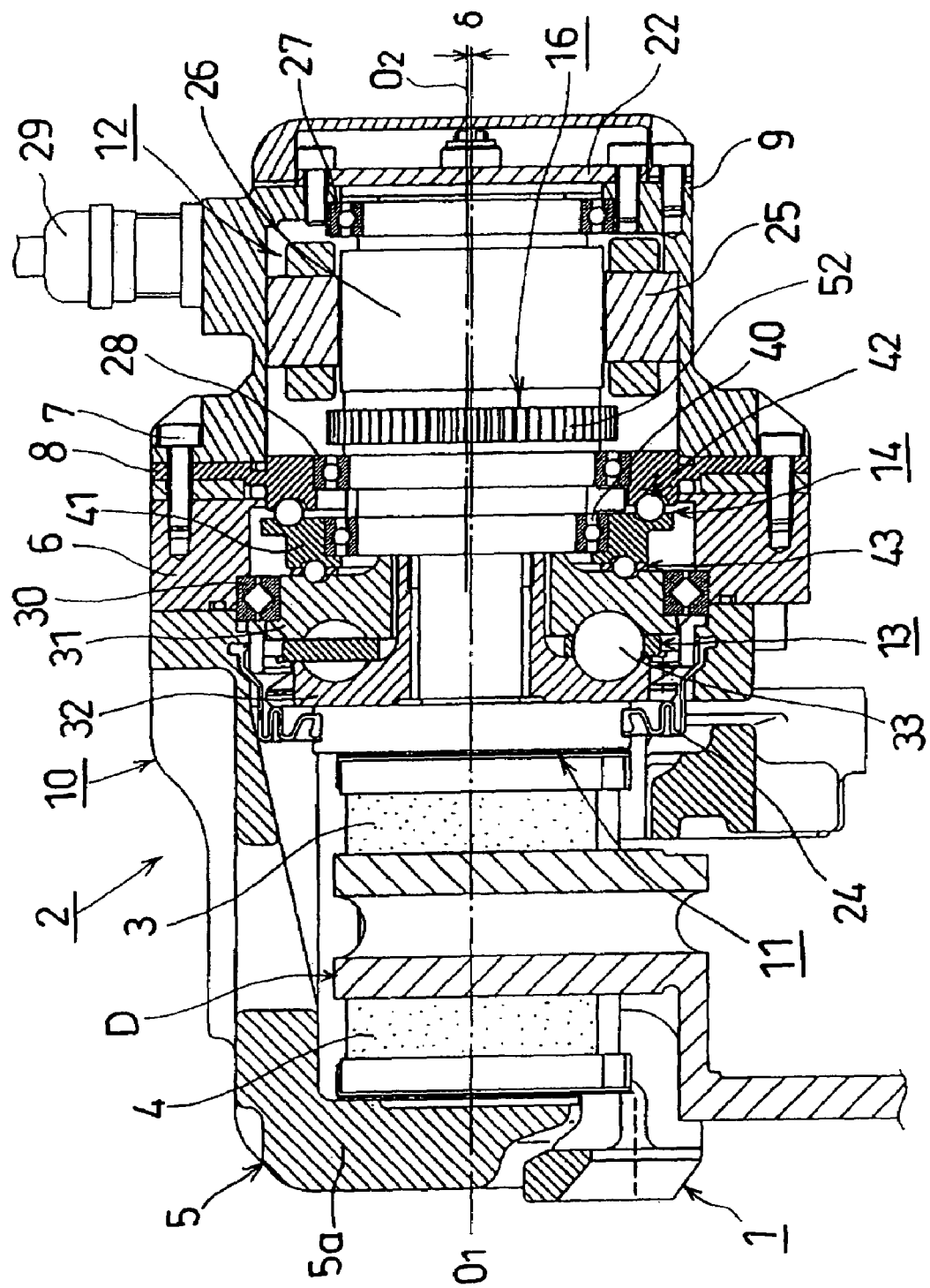
FIG. 5 is a sectional view showing the overall structure of an electric disc brake apparatus according to the present invention.
Figure 6:
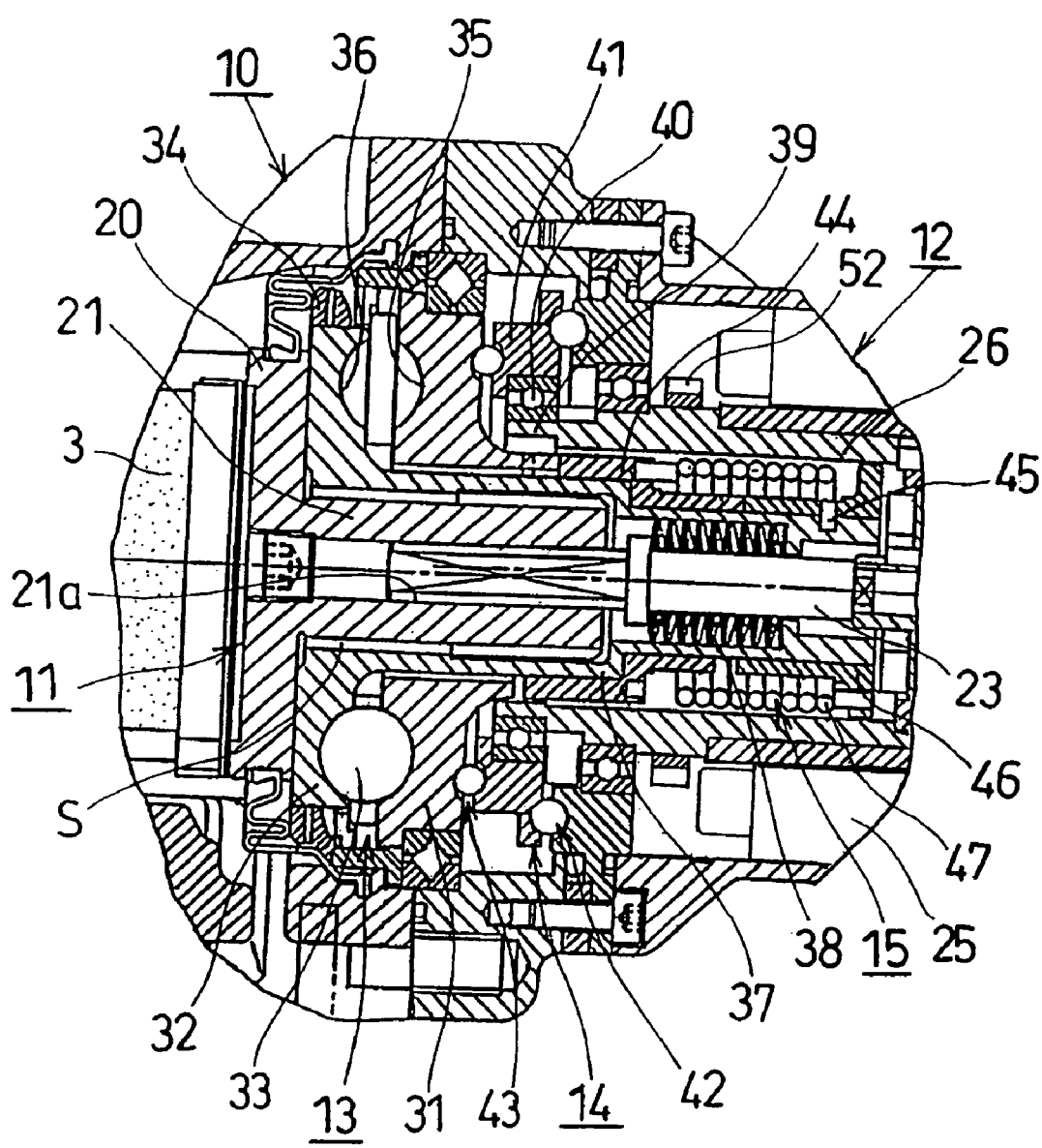
FIG. 6 is a sectional view showing an enlargement of a part of this electric disc brake apparatus.

FIGS. 5 and 6 show the overall structure of an electric disc brake apparatus serving as an embodiment of the present invention. In these drawings, numeral 1 designates a carrier fixed to a non-rotational portion (a knuckle or the like) of a vehicle, this carrier being positioned further inside the vehicle than a disc rotor D, numeral 2 designates a caliper which is floatably supported by the carrier 1 in the axial direction of the disc rotor D, and numerals 3 and 4 designate a pair of brake pads arranged on both sides of the disc rotor D. The brake pads 3 and 4 are supported by the carrier 1 so that they can move in the axial direction of the disc rotor D. The caliper 2 comprises an assembly-type caliper main body 10 constituted by a claw member 5 having a claw portion 5a at the front end side, an annular base member 6 coupled to the base of the claw member 5 by means of bolts (not illustrated), and an annular support plate 8 and a motor case 9, both of which are coupled to the base member 6 by means of bolts 7. The claw portion 5a of the claw member 5 is disposed in the vicinity of the back face of the brake pad 4, which is located toward the outside of the vehicle.

In this embodiment, a piston 11 capable of abutting against the back face of the brake pad 3 facing the interior of the vehicle, a motor (first actuator) 12, a ball ramp mechanism (rotation-linear movement conversion mechanism) 13 for converting the rotation of the motor 12 into linear movement and transmitting this linear movement to the piston 11, a differential speed reducing mechanism 14 for reducing the rotation speed of the motor 12 and transmitting the rotation to the ball ramp mechanism 13, a pad wear compensating mechanism 15 which compensates for wear to the brake pads 3, 4 by adjusting the position of the piston 11 in accordance with wear to the pads, and a parking brake locking mechanism (holding mechanism) 16 (FIGS. 1 to 3) serving as a parking brake to be described below, are arranged inside the aforementioned caliper 2.

The piston 11 comprises a main body portion 20 with a large diameter and a shaft portion 21 with a small diameter. The main body portion 20 is disposed in the vicinity of the brake pad 3 toward the interior of the vehicle. The shaft portion 21 of the piston 11 is provided with a shaft hole 21a having a square cross-section. By inserting the front end portion of a support rod 23 which extends from an end plate 22 of the motor case 9 into the shaft hole 21a, the piston 11 is slidably but non-rotatably supported by the support rod 23. Further, a cover 24 made of rubber for sealing the interior of the caliper main body 10 from the outside is provided between the main body portion 20 of the piston 11 and the caliper main body 10.

The motor 12 is a brushless motor comprising a stator 25 fixedly fitted into the motor case 9 and a hollow rotor 26 disposed inside the stator 25. Note that instead of a brushless motor, an ultrasonic motor or the like may be applied as the motor. The rotor 26 is pivotally supported by the motor case 9 and the support plate 8 through bearings 27 and 28. Having received a command from a controller (operating condition detection means) 100 shown in FIG. 11, the motor 12 operates to rotate the rotor 26 at a desired torque and over a desired angle. The rotational angle (rotational position) of the rotor 26 is detected by a rotational position detector 101 shown in FIG. 11, which is disposed in the interior of the rotor 26. The rotational position and thrust of the motor 12 have a constant relationship as shown in the schematic diagram in FIG. 12. This relationship is measured in advance and stored in the controller 100. The thrust can thus be learned from data detected by the rotational position detector 101.

Note that the caliper main body 10 is attached with a connector 29 for wiring a signal line that connects the stator 25 and rotational position detector 101 with the controller 100.

The ball ramp mechanism 13 is provided with a ring-shaped first disc (pivoting member) 31 which is pivotally supported by the inner periphery of the annular base member 6 of the caliper main body 10 via a cross roller bearing 30, a ring-shaped second disc (linearly moving member) 32 which is coupled to the shaft portion 21 of the piston 11 via a screw portion S, and three balls 33 interposed between the two discs 31 and 32. The second disc 32 is arranged to abut against the rear face of the main body portion 20 of the piston 11, and is normally restricted from rotating by the friction force of a wave washer 34 interposed between the second disc 32 and the caliper main body 10.

The three balls 33 are respectively inserted into three ball grooves 35 and 36 which are formed in arc-form around the circumference on opposing faces of the first disc 31 and second disc 32. The ball grooves 35 and 36 are inclined in the same direction and disposed at equal intervals within an equal center angle range (for example, 90°). When the first disc 31 rotates in a counterclockwise direction as seen from the right in FIGS. 5 and 6, the second disc 32 receives a pressing force toward the left in the drawings. At this time, rotation of the second disc 32 is restricted by the wave washer 34, and therefore the second disc 32 moves linearly (forward) without rotating. As a result, the piston 11 is moved forward (propelled), and thus presses the brake pad 3 facing the interior of the vehicle against the disc rotor D.

Meanwhile, an extended cylindrical portion 37 which extends greatly toward the end plate 22 side of the motor case 9 is provided continuously along the portion of the second disc 32 which is screwed to the shaft portion 21 of the piston 11 (screw portion S). A plurality of disc springs 38 having one end latched to the support rod 23, and which normally urge the second disc 32 toward the first disc 31 via the extended cylindrical portion 37, are arranged inside the extended cylindrical portion 37. Thereby, the three balls 33 of the ball ramp mechanism 13 are strongly pressed between the two discs 31 and 32, and when the first disc 31 rotates clockwise as seen from the right in FIGS. 5 and 6, the second disc 32 moves rearward to the right in the drawings, thereby separating the piston 11 from the brake pad 3.

As is clearly illustrated in FIG. 6, the differential speed reducing mechanism 14 is constituted by an eccentric shaft 39 formed at the end of the rotor 26 of the motor 12 which extends toward the disc rotor D side, an eccentric plate 41 mounted to fit to the eccentric shaft 39 pivotally via a bearing 40, an Oldham mechanism 42 interposed between the eccentric plate 41 and the support plate 8 of the caliper main body 10, and a cycloid ball speed reducing mechanism 43 interposed between the eccentric plate 41 and the first disc 31 of the ball ramp mechanism 13. When the Oldham mechanism 42 is operated, the eccentric plate 41 does not rotate but revolves in accordance with the rotation of the eccentric shaft 39. Meanwhile, the cycloid ball speed reducing mechanism 43 is operated in accordance with the revolving motion of the eccentric plate 41, and thus the first disc 31 rotates in the opposite direction to the rotor 26 at constant rotation ratio with the rotor 26. Note that in FIG. 5, notation O1 designates the rotational center of the rotor 26, notation O2 designates the rotational center of the eccentric shaft 39, and notation δ designates the amount of eccentricity of these two members.

Here, the rotation ratio N of the first disc 31 to the rotor 26 becomes $N=(D-d)/D$, where d is the diameter of a reference circle of a cycloid groove on the side of the eccentric plate 41 in the cycloid ball speed reducing mechanism 43 and D is the diameter of a reference circle of a cycloid groove on the side of the first disc 31. In this case, the number of revolutions of the rotor 26 when the first disc 31 rotates once is a speed reduction ratio $\alpha(=1/N)$. Further, when the rotor 26 is rotated by a certain angle θ, the second disc 32 advances by $S=(L/360)\times(\theta/\alpha)$, where the rotational angle θA of the first disc 31 is $\theta/\alpha$, and L is the inclination (lead) of the ball grooves 35 and 36 of the ball ramp mechanism 13.

As is clearly illustrated in FIG. 6, the pad wear compensating mechanism 15 comprises a limiter 44 which is pivotally fitted into the extended cylindrical portion 37 of the second disc 32 of the ball ramp mechanism 13 and operationally connected to the first disc 31 with a clearance in the rotational direction, a spring holder 46 which is fitted into the extended cylindrical portion 37 of the second disc 32 and fixed in position relative to the second disc 32 by a pin 45, and a coil spring 47 which is arranged around the spring holder 46 such that one end is connected to the limiter 44 and the other end is connected to the spring holder 46.

The pad wear compensating mechanism 15 functions in such a manner that, when the brake pads 3 and 4 become worn, the limiter 44 rotates in accordance with the rotation of the first disc 31 of the ball ramp mechanism 13, whereupon this rotation is transmitted to the second disc 32 via the coil spring 47, the spring holder 46 and the pin 45. The piston 11, which is restricted from rotating by the support pin 23, then moves forward along the support pin 23 until the brake pad 3 is pressed against the disc rotor D, or in other words until a braking force is generated, and thus the gap caused by the pad wear is eliminated. Meanwhile, once the braking force has been generated, large friction resistance produced at the screw portion S between the piston 11 and second disc 32 prevents the second disc 32 from rotating, and hence rotational misalignment between the second disc 32 and first disc 31, or in other words rotational misalignment between the spring holder 46 and limiter 44, is absorbed by twisting of the coil spring 47.

As is clearly illustrated in FIGS. 1 through 3, the parking brake locking mechanism 16 is schematically constituted by a locking mechanism 50 capable of locking and unlocking the rotation of the rotor 26 of the motor 12 in a brake releasing direction L, and a PKBSOL (PKB solenoid, to be referred to as "solenoid" below where appropriate) 51 for activating the locking and unlocking operations of the locking mechanism 50. In this embodiment, the solenoid 51 constitutes a second electric actuator and an actuator.

Figure 1:
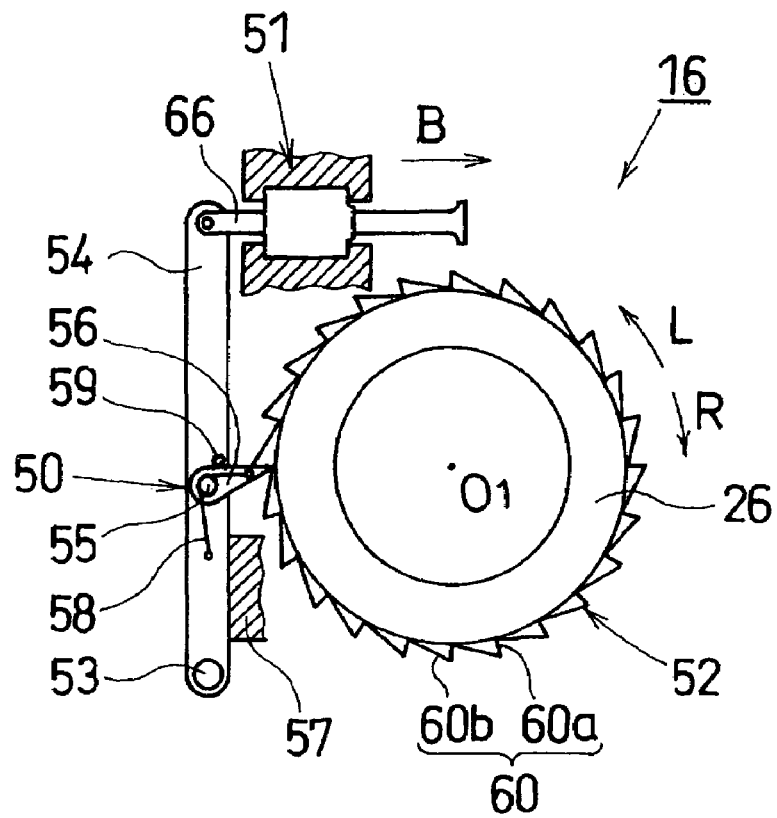
FIG. 1 is a schematic view showing the structure of a parking brake locking mechanism according to an embodiment of the present invention.

The locking mechanism 50 comprises a claw wheel 52 formed integrally with the outer peripheral face of the rotor 26, an oscillating arm 54 disposed beside the claw wheel 52 and pivotally attached at its base end to the caliper main body 10 using a pin 53, an engaging claw 56, the base end of which is pivotally attached midway along the length of the oscillating arm 54 using a pin 55, a stopper portion 57 provided on the caliper main body 10 which abuts against a side face of the oscillating arm 54 to cause the oscillating arm 54 to stand in a tangential direction to the rotor 26, a torsion spring (urging means) 58 for urging the engaging claw 56 in a counterclockwise direction as seen in FIG. 1 during normal operations, and a projection 59 for holding the engaging claw 56 in a standing attitude enabling engagement with the claw wheel 52 in cooperation with the torsion spring 58. Here, each of the tooth portions 60 of the claw wheel 52 is provided with a tooth shape in which a tooth face 60a faces the front side of a rotational direction L of the rotor 26 during braking release (the counterclockwise direction when viewed from the right in FIGS. 5 and 6), and an inclined escape face 60b faces the front side of a rotational direction R of the rotor 26 during a braking operation (the clockwise direction when viewed from the right in FIGS. 5 and 6).

Figure 4:
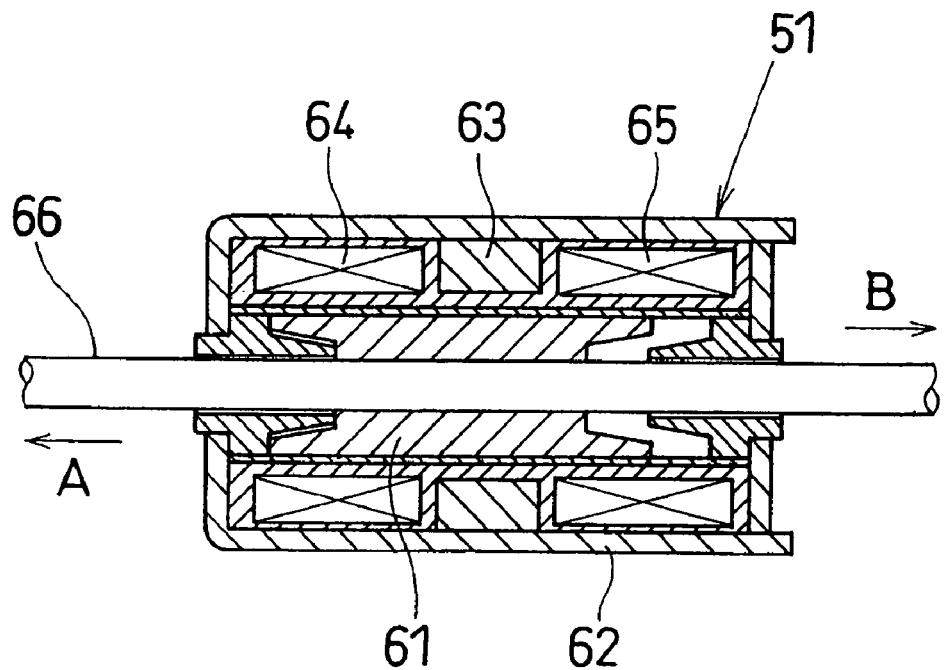
FIG. 4 is a sectional view showing the structure of a self-holding type solenoid used in this embodiment.

Here, the solenoid 51 is constituted as a bi-directional self-holding type solenoid. As shown in FIG. 4, in this bi-directional self-holding type solenoid 51, two coils 64, 65 are arranged in series on either side of a permanent magnet 63 inside housing 62 which slidably accommodates a plunger 61, and a rod 66 is supported in the plunger 61. When an electric current is supplied to either one of the coils 64 or 65, the plunger 61 moves in one of two directions, A or B, but is held at a forward end or rearward end by the attraction of the permanent magnet 63.

Note that in this embodiment, the solenoid 51 constitutes the second electric actuator and the actuator, but these actuators are not limited to a solenoid, and a direct driven-type actuator such as a piezoelectric element or a rotary actuator such as a stepping motor may also be used.

Figure 2:
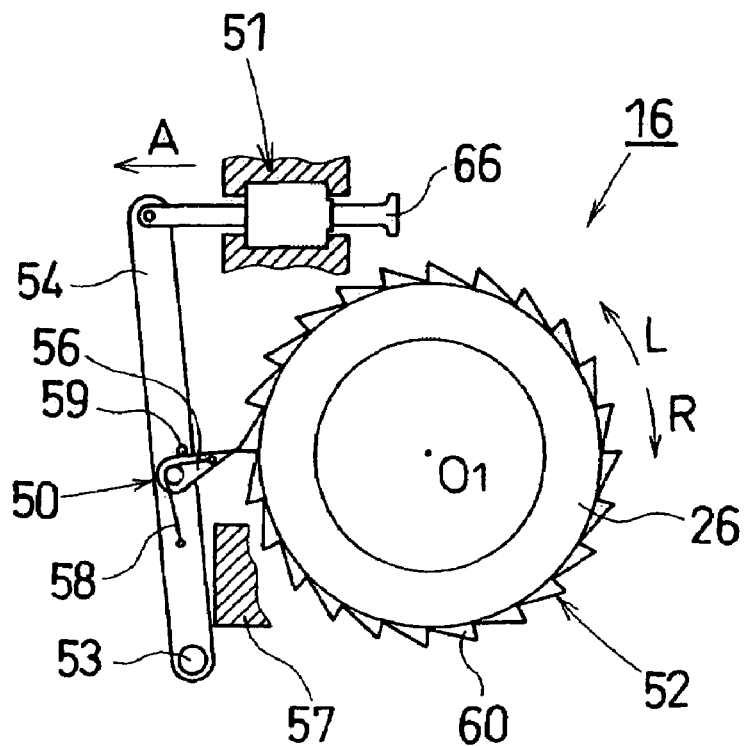
FIG. 2 is a schematic view showing the parking brake locking mechanism in operation according to this embodiment.
Figure 3:
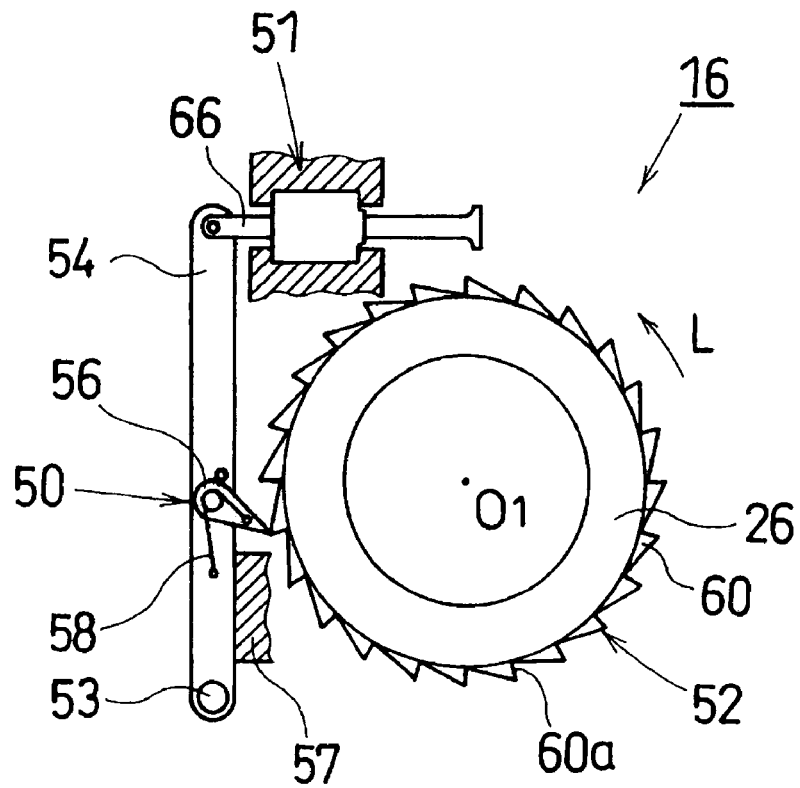
FIG. 3 is a schematic view showing the parking brake locking mechanism in operation according to this embodiment.

As shown in FIGS. 1 through 3, the parking brake locking mechanism 16 is constituted such that the self-holding type solenoid 51 is provided on the caliper main body 10, and one end portion of the rod 66 integrated with the plunger 61 is rotatably attached to the distal end portion of the oscillating arm 54 on the side of the locking mechanism 50.

In the parking brake locking mechanism 16 having such a constitution, when one of the coils 64 of the solenoid 51 is energized, the rod 66 moves in the leftward direction (forward direction) A shown in FIG. 2 integrally with the plunger 61, causing the oscillating arm 54 to oscillate away from the rotor 26 such that the distal end of the engaging claw 56 moves away from the tooth portions 60 of the claw wheel 52. In other words, the locking mechanism 50 performs an unlocking operation, as a result of which the rotor 26 becomes free to rotate in the brake releasing direction L and the braking direction R. In this case, the plunger 61 is held at the forward end even when the electrical current is cut, and hence electrification of the coil 64 can be performed temporarily. When the other coil 65 is energized from this state, the rod 66 moves in the rightward direction (rearward direction) B shown in FIG. 1 integrally with the plunger 61, causing the oscillating arm 54 to oscillate toward the rotor 26 such that the distal end of the engaging claw 56 is engaged with the tooth portion 60 of the claw wheel 52. In other words, the locking mechanism 50 performs a locking operation, as a result of which rotation of the rotor 26 in the brake releasing direction L is restricted. Likewise in this case, the plunger 61 is held at the rearward end even when the electrical current is cut, and hence electrification of the coil 65 can be performed temporarily. If the motor 12 is energized to force the rotor 26 to rotate in the brake releasing direction L when the locking mechanism 50 has performed a locking operation, the motor torque becomes greater than the urging force of the torsion spring 58, and hence the engaging claw 56 is pushed downward by the tooth face 60a of the tooth portion 60 on the claw wheel 52 as shown in FIG. 3, enabling the rotor 26 to rotate in the brake releasing direction L.

As described above, the distal end portion of the engaging claw 56 is designed to separate from the tooth portions 60 of the claw wheel 52 or engage with the tooth portions 60, and hence in this embodiment, the engaging claw 56 constitutes an "engaging claw capable of engaging with and separating from a claw wheel".

Figure 11:
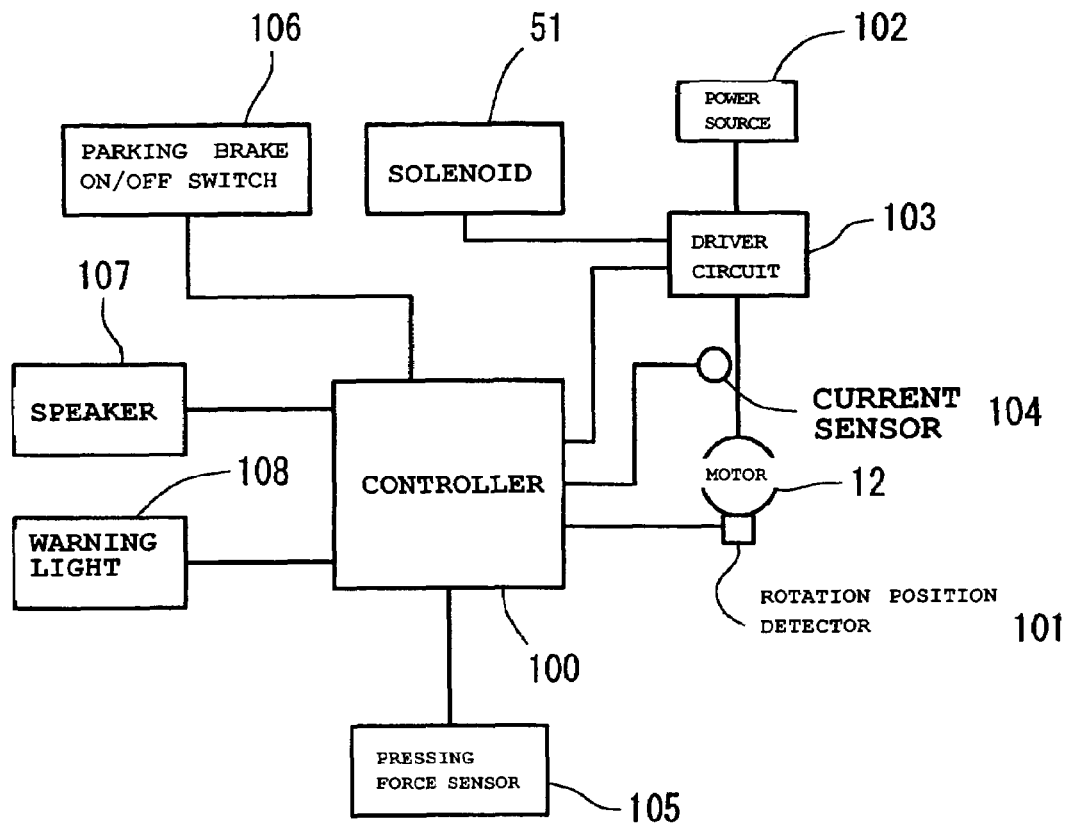
FIG. 11 is a circuit diagram showing a controller of the electric disc brake apparatus and members connected thereto.
Figure 12:
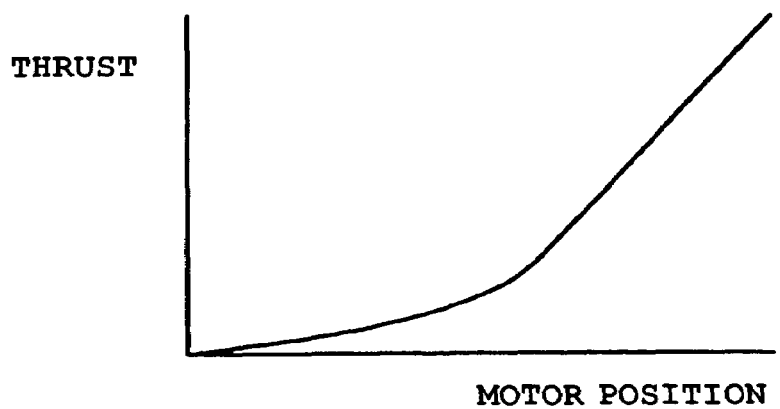
FIG. 12 is a characteristic diagram showing the relationship between the motor position and thrust of the motor in FIG. 1.

As shown in FIG. 11, the solenoid 51 is supplied with power from a power source 102 via a driver circuit 103. The driver circuit 103 is controlled by the controller 100 to drive the solenoid 51. The motor 12 is also supplied with power from the power source 102 via the driver circuit 103. The driver circuit 103 is controlled by the controller 100 to drive the motor 12, and hence functions as a solenoid driver and a motor driver. The driver circuit 103 and rotation position detector 101 are connected to the controller 100. A current sensor 104 for detecting a current flowing into the motor 12, a pressing force sensor 105, a parking brake on/off switch 106, a speaker 107, and a warning light 108 are also connected to the controller 100.

Operations of the electric disc brake apparatus serving as the embodiment described above will be described below, divided into a braking operation and operation confirmation (an operation check) of the locking mechanism 50 (the parking brake locking mechanism 16).

First, a braking operation will be described on the basis of FIGS. 1 through 6 and with reference to FIGS. 7 through 10.

[Normal Braking]

Figure 7:
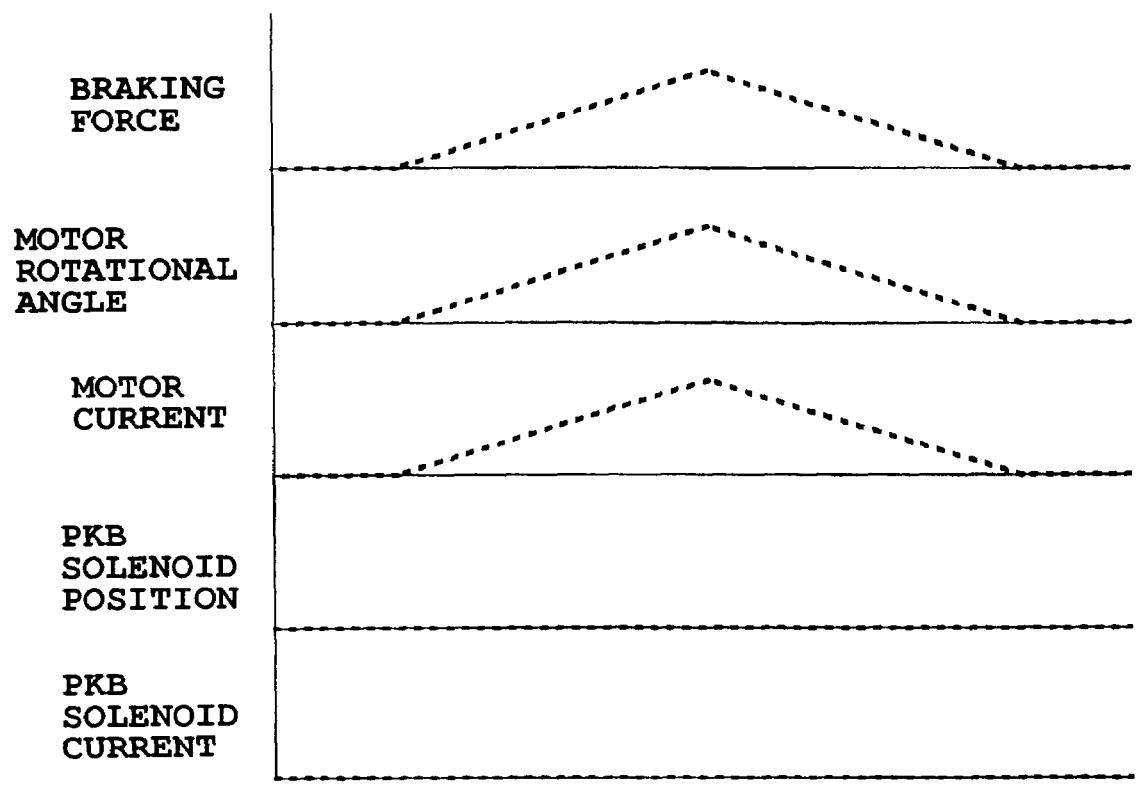
FIG. 7 is a time chart showing the operational timing of an electric brake and a parking brake in this electric disc brake apparatus.

During a normal braking operation of the electric brake, a brake operation by the driver causes the rotor 26 of the motor 12 to rotate clockwise as viewed from the right in FIGS. 5 and 6. At this time, as shown in FIG. 2, the solenoid 51 of the parking brake locking mechanism 16 moves the rod 66, integrally with the plunger 61, to the forward end, where the locking mechanism 50 is held in an unlocked state by the self-holding function of the solenoid 51. Hence, when the rotor 26 rotates clockwise as described above, the eccentric plate 41 attached via the bearing 40 to the eccentric shaft 39, which is integrated with the rotor 26, is caused to revolve, but not rotate, by the Oldham mechanism 42. The revolving motion of the eccentric plate 41 causes the cycloid ball speed reducing mechanism 43 to operate, whereby the first disc 31 of the ball ramp mechanism 13 rotates in the opposite direction to the rotor 26 (the counterclockwise direction) at the constant rotation ratio N with the rotor 26, as described above. Since the second disc 32 of the ball ramp mechanism 13 is restricted from rotating by the resistance force of the wave washer 34, the second disc 32 moves forward toward the disc rotor D as the first disc 31 rotates. As a result, the piston 11 moves and the brake pad 3 facing the interior of the vehicle is pressed against the disc rotor D. In reaction thereto, the caliper 2 moves relative to the carrier 1, whereby the claw portion 5a of the claw member 5 presses the brake pad 4 facing the outside of the vehicle against the outside face of the disc rotor D. Thus a braking force corresponding to the rotational angle and torque (current) of the motor 12 is generated as shown in FIG. 7. Note that when the brake pads 3 and 4 become worn, the pad wear compensating mechanism 15 is operated to eliminate the gap caused by the pad wear as described above. Further, during the braking operation, the self-holding type solenoid 51 is in a non-energized state, but the locking mechanism 50 is maintained in an unlocked state.

[Normal Brake Release]

When the electric brake is released, or in other words during normal braking release, by a release operation performed by the driver, the rotor 26 of the motor 12 rotates counterclockwise as viewed from the right in FIGS. 5 and 6. Accordingly, the urging force of the plurality of disc springs 38 moves the second disc 32 rearward integrally with the piston 11. The force pressing against the disc rotor D is thereby released, and thus the electric brake is released. At this time, the self-holding type solenoid 51 is in a non-energized state and the locking mechanism 50 of the parking brake locking mechanism 16 is held in an unlocked state. Hence the rotor 26 rotates smoothly in the brake releasing direction L (FIG. 2).

[Occurrence of an Abnormality during Normal Braking]

Figure 8:
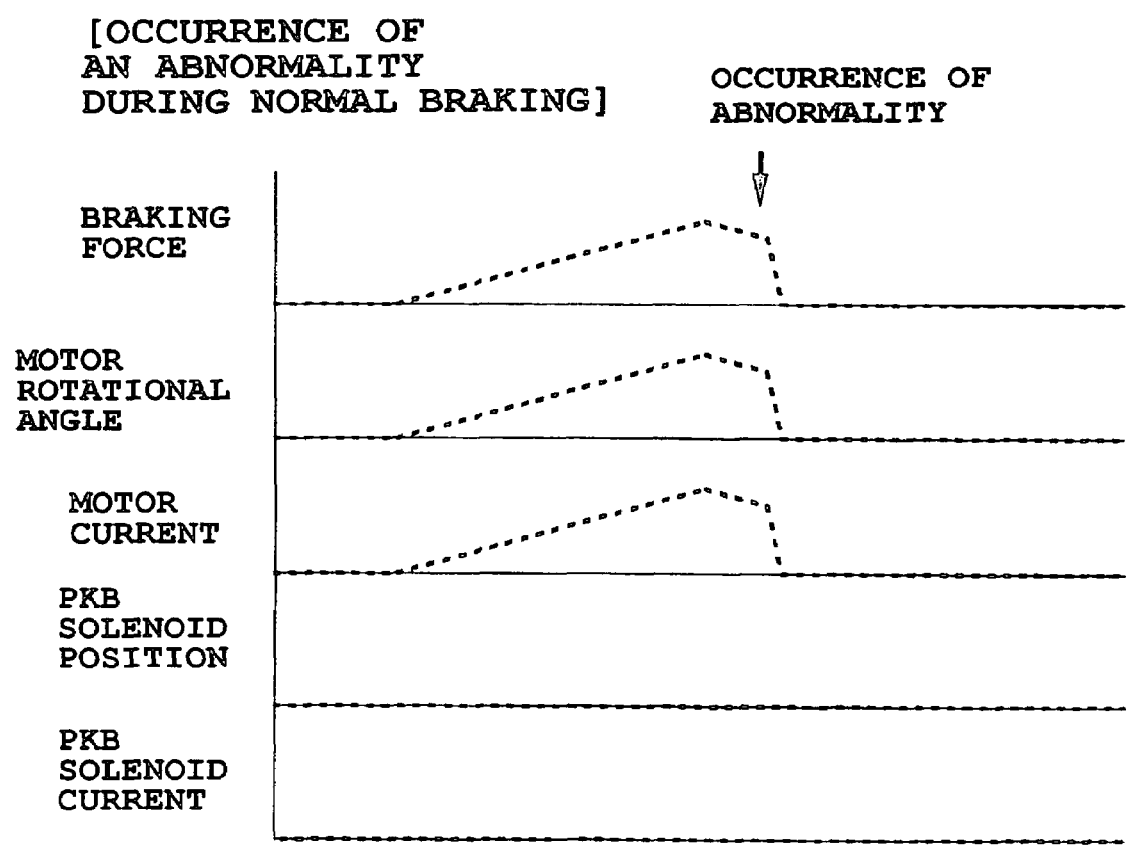
FIG. 8 is a time chart showing the operational timing of the electric brake and parking brake in this electric disc brake apparatus.

If a breakdown occurs in the electric circuit of the motor 12 for some reason during the normal braking operation described above, the torque (current) of the motor 12 falls as shown in FIG. 8, and hence the coil spring 47, which serves as a piston returning mechanism, or a reactive force from the braking causes the piston 11 to move rearward. The second disc 32 then moves rearward, causing the rotor 26 of the motor 12 to rotate counterclockwise as viewed from the right in FIGS. 5 and 6 to return to its original rotational angle, and thus the electric brake is released. Since the locking mechanism 50 of the parking brake locking mechanism 16 is held in an unlocked state at this time, similarly to the normal braking operation, the electric brake is released smoothly.

[Operation of the Parking Brake (PKB)]

Figure 9:
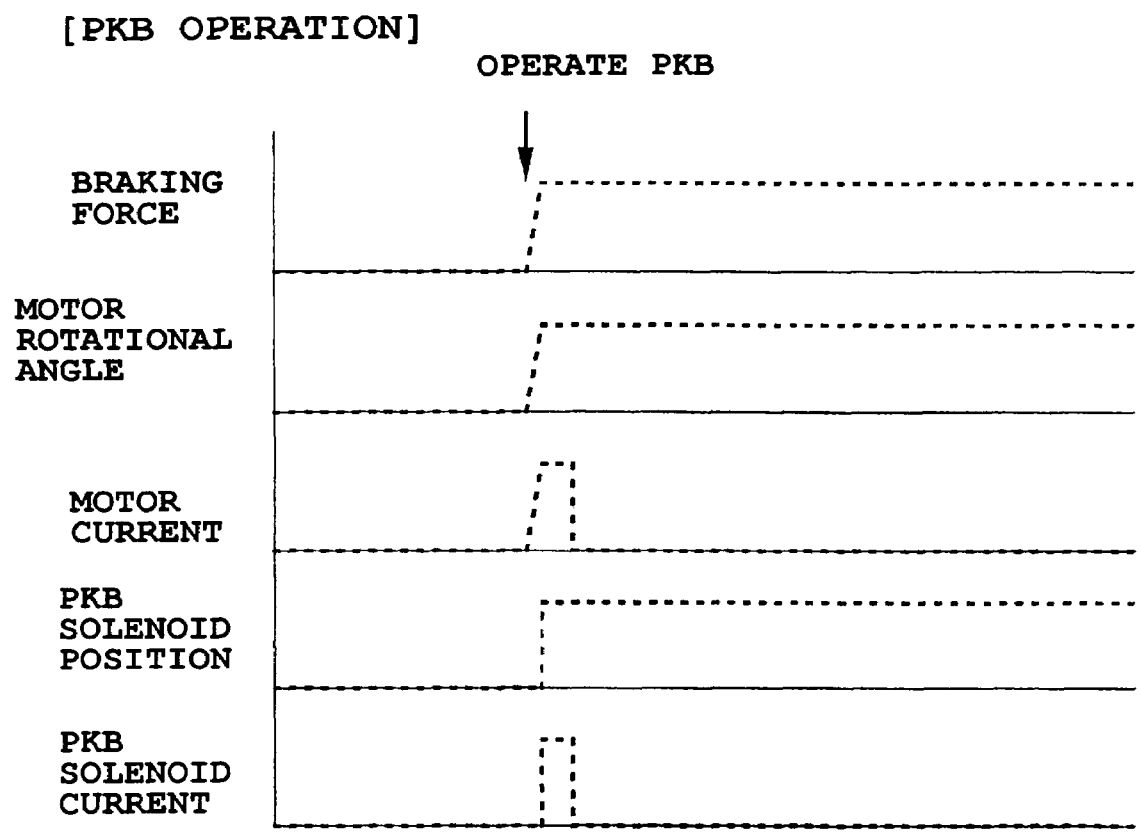
FIG. 9 is a time chart showing the operational timing of the electric brake and parking brake in this electric disc brake apparatus.

When the parking brake is operated, the parking brake operation performed by the driver causes the rotor 26 of the motor 12 to rotate clockwise as viewed from the right in FIGS. 5 and 6, thereby causing the piston 11 to move in a similar manner to the above-described normal braking operation such that a braking force proportional to the rotational angle and torque (current) of the motor 12 is generated as shown in FIG. 9. Simultaneously with the generation of this braking force, a current is supplied temporarily to the other coil 65 (FIG. 4) in the self-holding type solenoid 51 of the parking brake locking mechanism 16. Thereby, the rod 66 moves in the rearward direction B integrally with the plunger 61 in the solenoid 51, causing the locking mechanism 50 to enter a locked state. Thus, as shown in FIG. 1, the rotor 26 is restricted from rotating in the brake releasing direction L. At approximately the same time as the self-holding type solenoid 51 is temporarily energized, the current supply to the motor 12 is cut off. As a result, the locking mechanism 50 of the parking brake locking mechanism 16 is maintained in a locked state by the self-holding function of the solenoid 51, and thus the parking brake is maintained in a stable condition as shown in FIG. 9.

[Parking Brake (PKB) Release]

Figure 10:
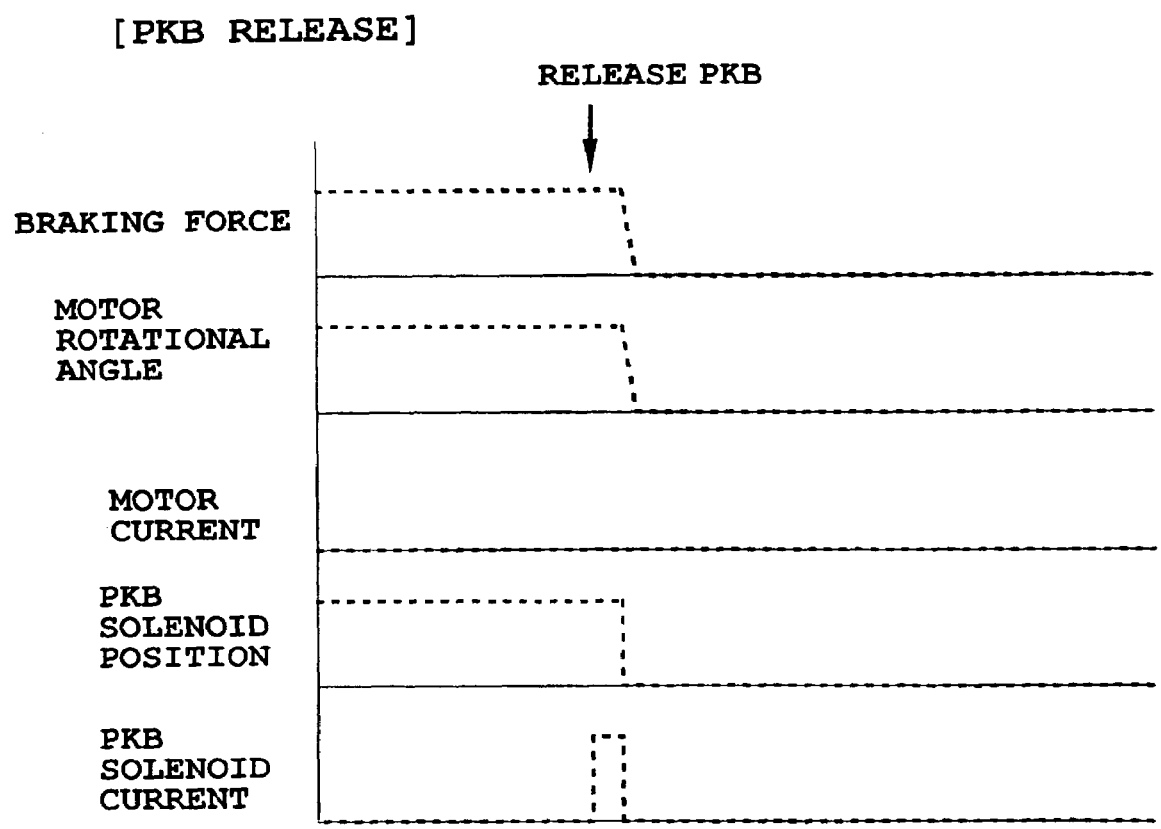
FIG. 10 is a time chart showing the operational timing of the electric brake and parking brake in this electric disc brake apparatus.

When the parking brake is released, the parking brake release operation performed by the driver causes the coil 64 (FIG. 4) of the self-holding type solenoid 51 of the parking brake locking mechanism 16 to be temporarily energized. Thereby, the rod 66 moves in the forward direction A integrally with the plunger 61 in the solenoid 51, and thus the locking mechanism 50 is caused to enter an unlocked state, enabling the rotor 26 to rotate freely in the brake releasing direction L, as shown in FIG. 2. At this time, the current supply to the motor 12 is halted, and hence the piston 11 is moved rearward by the reactive force of the braking, causing the second disc 32 to move rearward and the rotor 26 of the motor 12 to rotate counterclockwise as viewed from the right in FIGS. 5 and 6. As a result, as shown in FIG. 10, the motor 12 returns to its original rotational angle, and the parking brake is released.

Next, operation confirmation of the locking mechanism 50 (parking brake locking mechanism 16) will be described.

Operation confirmation of the locking mechanism 50 (parking brake locking mechanism 16) is performed in the following manner by means of calculation control by the controller 100. Operation confirmation of the locking mechanism 50 will be described with reference to FIGS. 13 through 25, divided into the following items: (1) [Operation confirmation when Pad Clearance is Open]; (2) [Unlocking Operation Checking]; (3) [Locking Operation Checking]; (4) [Locking Operation Checking following a Parking Brake Operation]; and (5) [Unlocking Operation Checking during Parking Brake Release].

(1) [Operation confirmation when Pad Clearance is Open]

This will be described on the basis of FIGS. 13 through 15.

The electric brake is capable of opening a pad clearance (clearance between the brake pad 3 and piston 11), and hence when thrust need not be generated (for example, when the vehicle is moving), a state of opened pad clearance can be established.

When the vehicle is moving, a determination is made as to whether clearance is opened (step S1). If a negative determination is made in step S1, the process returns to step S1, whereas if a positive determination is made (clearance open), checks of the unlocking operation of the locking mechanism 50 (parking brake locking mechanism 16) (step S2) and the locking operation of the locking mechanism 50 (step S3) are performed in succession, whereupon the process returns to step S1.

Operation confirmation of the locking mechanism 50 with open pad clearance may be performed either when the vehicle is moving or stationary, as long as pad clearance is open. Further, the flowchart shown in FIG. 3 may be implemented every time pad clearance is opened, or once following system activation. Note that if the brake is pressed (this being detected by the pressing force sensor 105) during implementation of the flowchart shown in FIG. 13, a braking force generation operation is given priority and performed instead of implementing the flowchart in FIG. 13.

Next, steps S2 (checking of an unlocking operation of the locking mechanism 50) and S3 (checking of a locking operation of the locking mechanism 50) will be described.

(2) [Unlocking Operation Checking] (Step S2)

Figure 14:
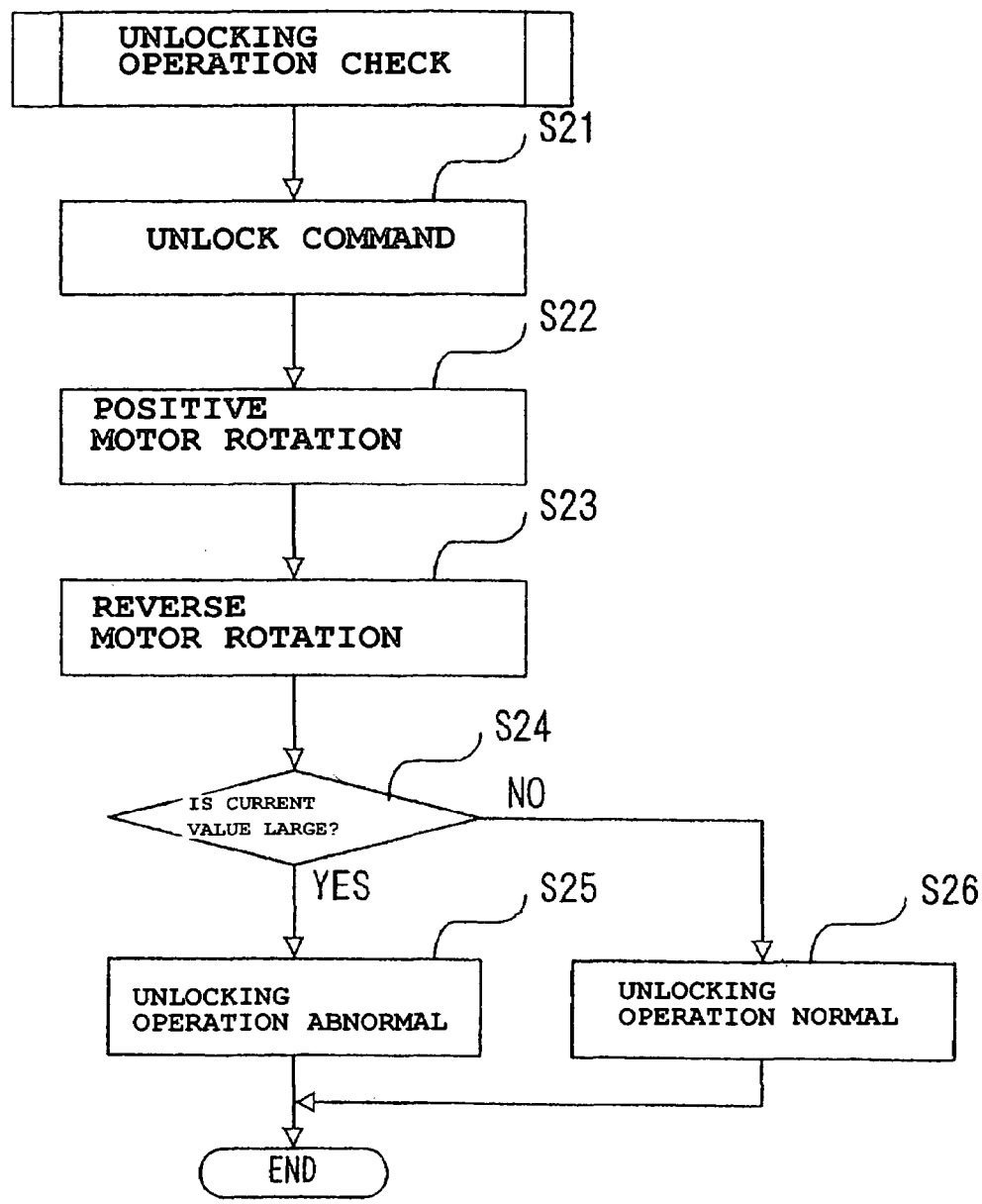
FIG. 14 is a flowchart showing the unlocking operation check in FIG. 13.
Figure 16:
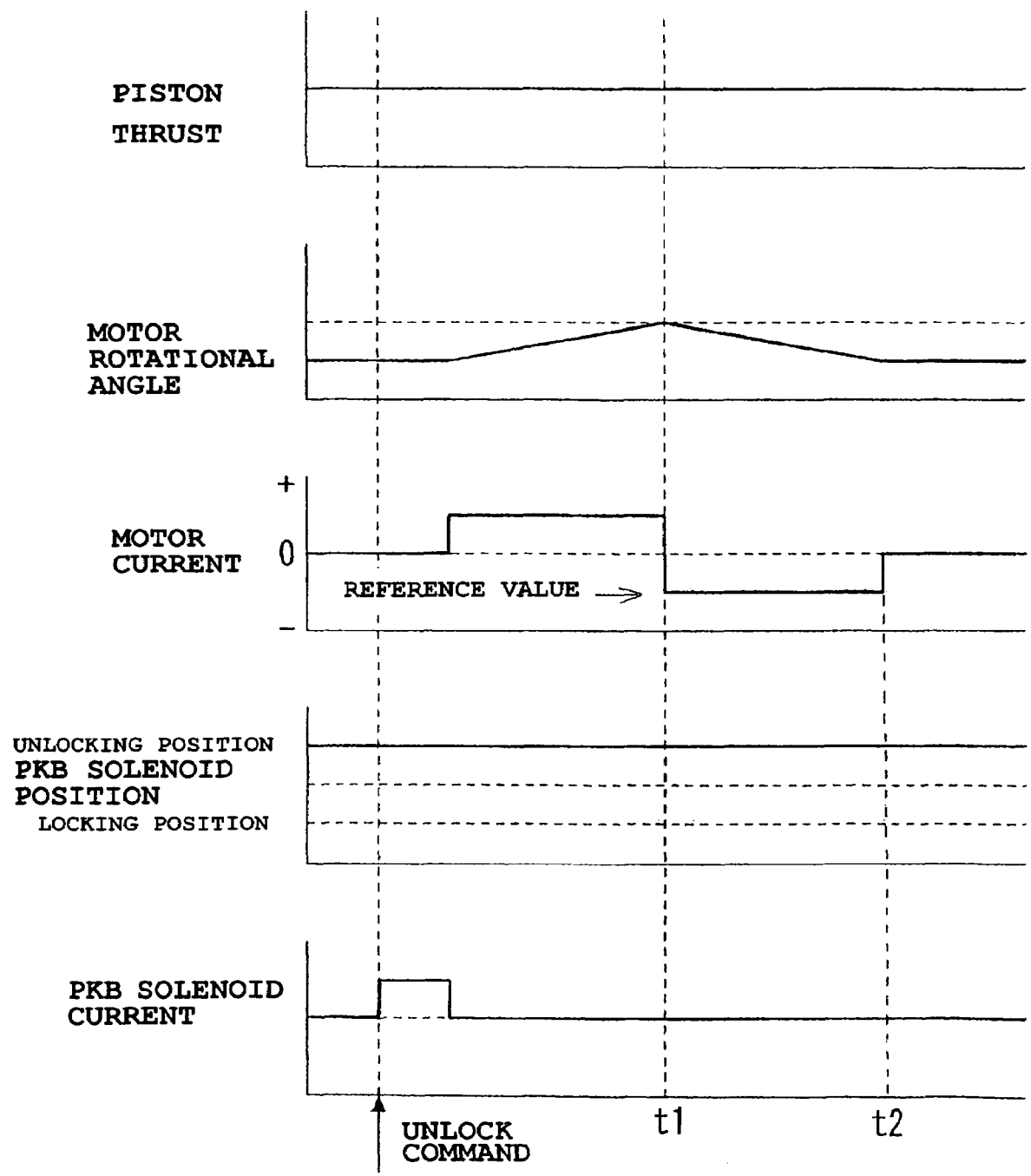
FIG. 16 is a time chart showing operational timing when the unlocking operation is found to be normal in FIG. 14.
Figure 17:
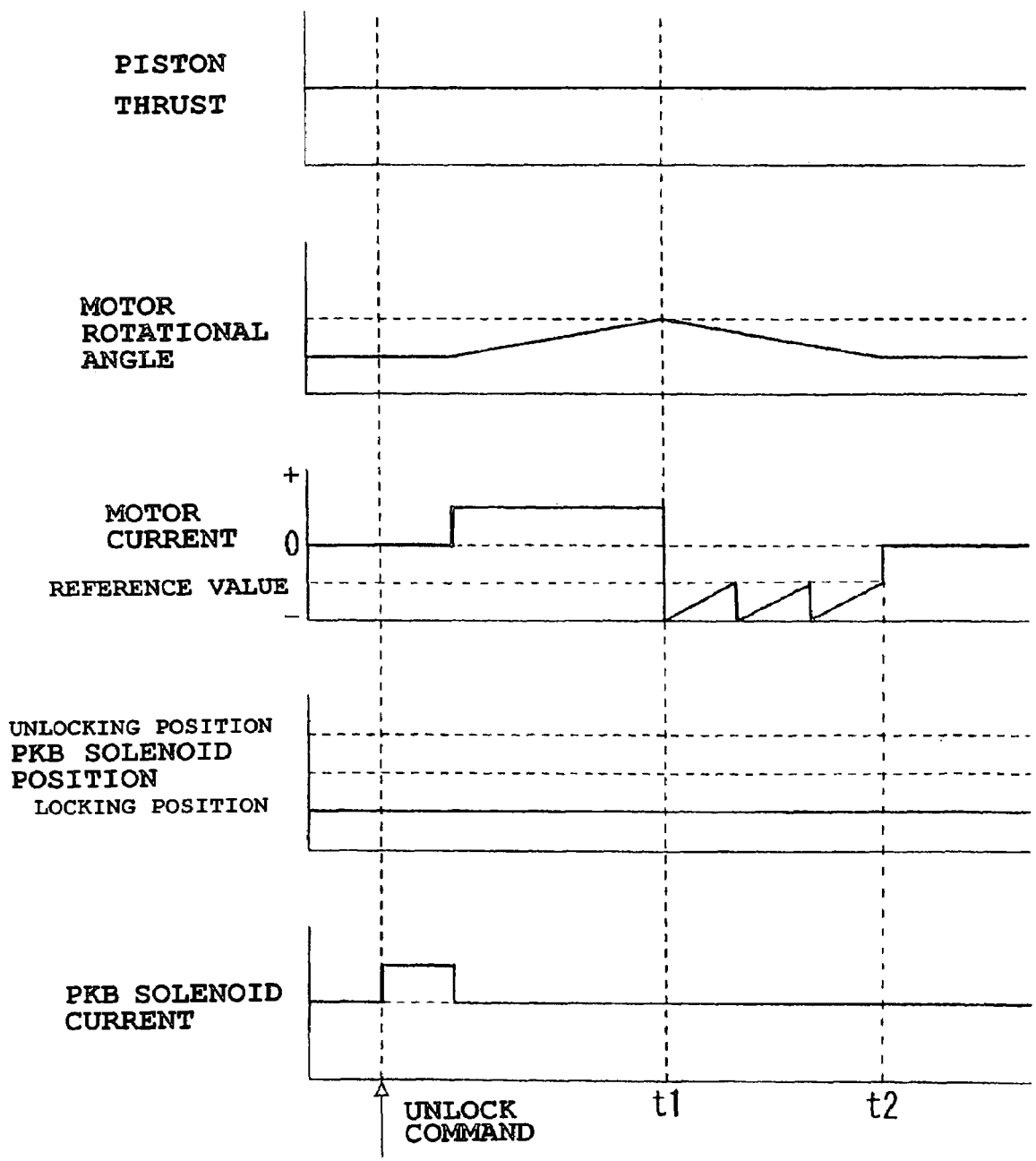
FIG. 17 is a time chart showing operational timing when the unlocking operation is found to be irregular in FIG. 14.

As shown in FIGS. 14, 16, and 17, in the subroutine of step S2 (an unlocking operation check), first an unlocking direction current is caused to flow into the solenoid 51 for a prescribed period of time (approximately 10 ms) in order to transmit an unlock command to cause the locking mechanism 50 to enter an unlocked state (step S21). Next, a positive rotation direction (+) current (motor current) is caused to flow into the motor 12, causing the motor 12 to rotate positively (in other words, such that the rotational angle of the motor becomes gradually larger) within a range at which thrust (piston thrust) is not generated in the piston 11 (step S22), and then, a reverse rotation direction (−) current (motor current) is caused to flow into the motor 12 to cause the motor 12 to rotate in reverse (in other words, such that the rotational angle of the motor becomes gradually smaller) (step S23).

Following step S23, the current flowing into the motor 12 to cause the motor 12 to rotate in reverse is detected by the current sensor 104, and a determination is made as to whether or not the detected value is larger than a predetermined reference value (step S24). Step S24 constitutes the operating condition detection means.

Figure 13:
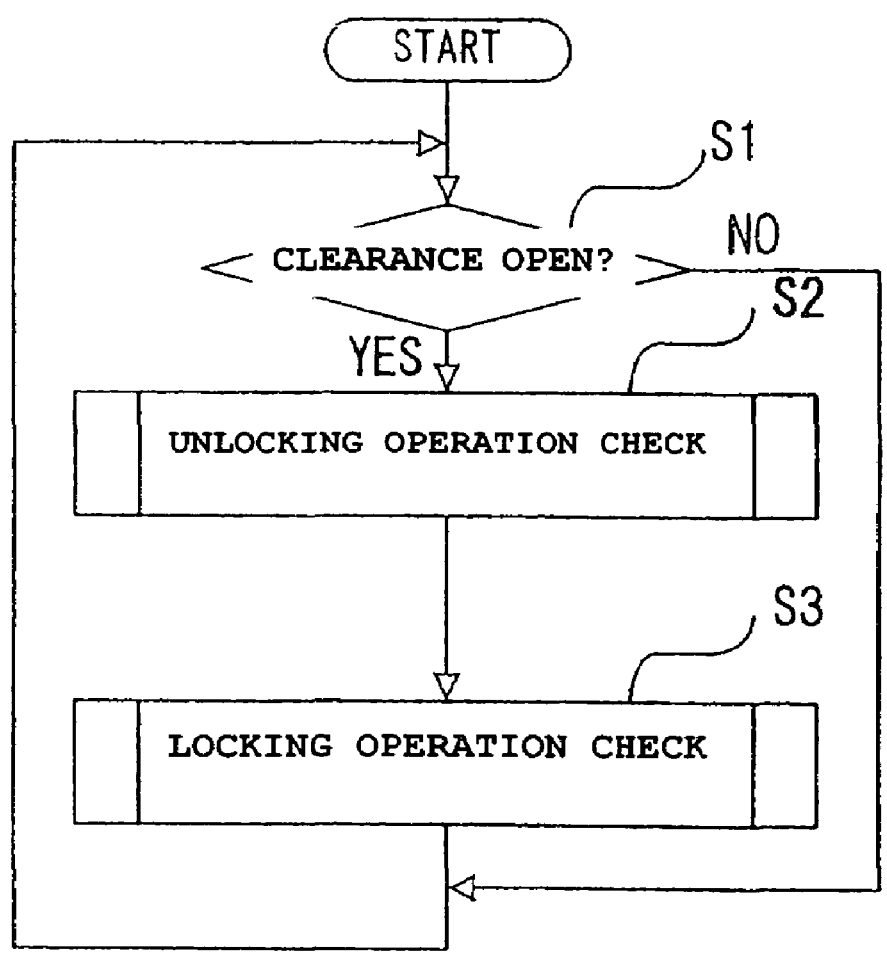
FIG. 13 is a flowchart showing an operational check on the parking brake locking mechanism of the electric disc brake apparatus.

If the unlocking operation of the locking mechanism 50 is performed normally in response to the unlock command issued in step S21, the current detected by the current sensor 104, or in other words the current (motor current) flowing into the motor 12, does not take a large value, and hence, as shown in FIG. 16, a current of the aforementioned reference value is caused to flow, a negative determination is made in step S24, processing for a normal unlocking operation is performed (step S26), and the process then returns to the flowchart in FIG. 13.

If, on the other hand, the unlocking operation of the locking mechanism 50 is not performed normally in response to the unlock command issued in step S21 (that is, when the locking mechanism 50 is in a locked state), the claw wheel 52 must negotiate the engaging claw 56 as the motor 12 rotates in reverse. As a result, a large load is placed on the motor 12, and thus a correspondingly large current is passed through the motor 12, causing the motor current to exceed the reference value as shown in FIG. 17. Hence in this case, a positive determination is made in step S24, processing for an abnormal unlocking operation is performed (step S25), and the process then returns to the flowchart in FIG. 13.

Note that when a positive determination is made in step S24 (that is, when the motor current is large, or in other words the unlocking operation is abnormal), the period of time during which a current is applied to the solenoid 51 may be increased in order to repeat the check, and checking of the unlocking operation may be repeated several times.

(3) [Locking Operation Checking] (Step S3)

Figure 15:
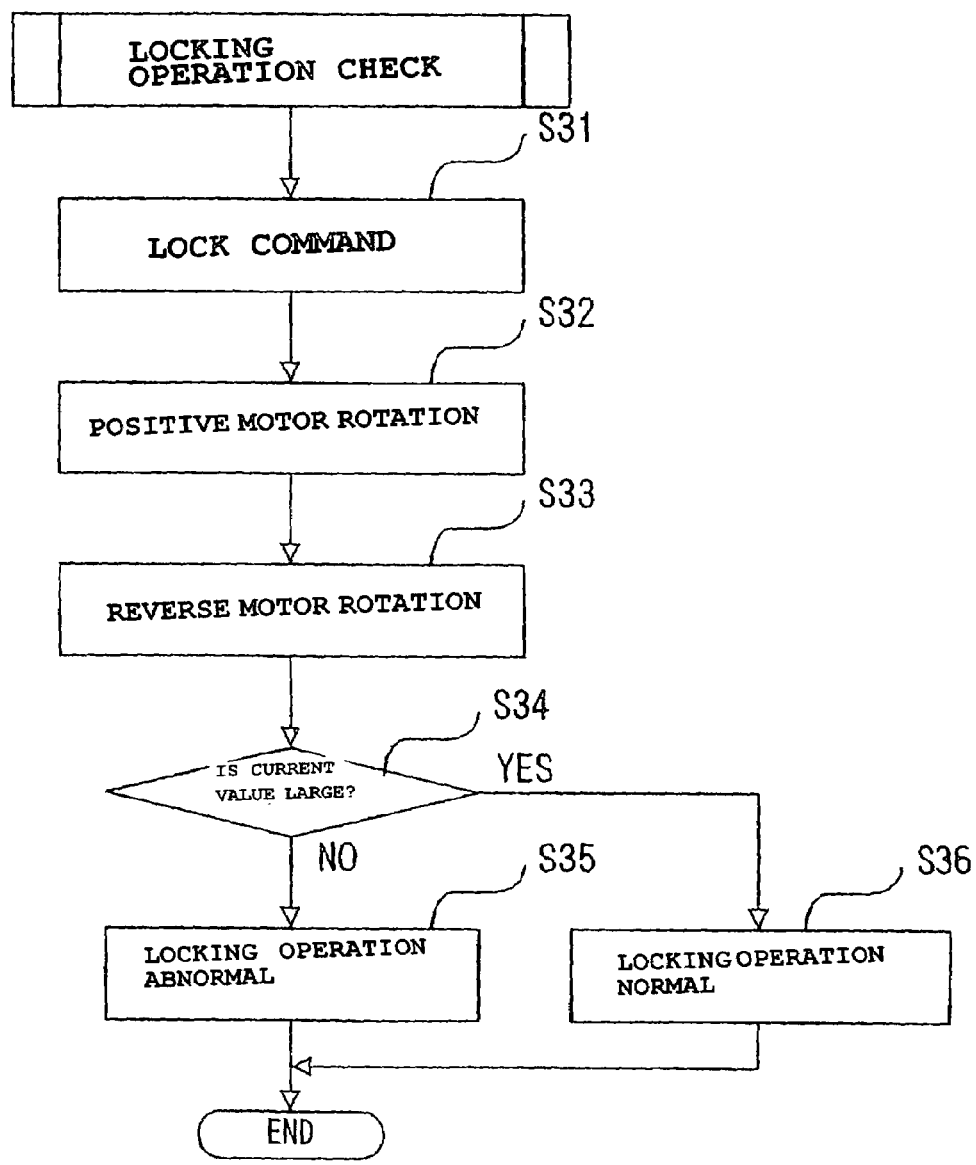
FIG. 15 is a flowchart showing the locking operation check in FIG. 13.
Figure 18:
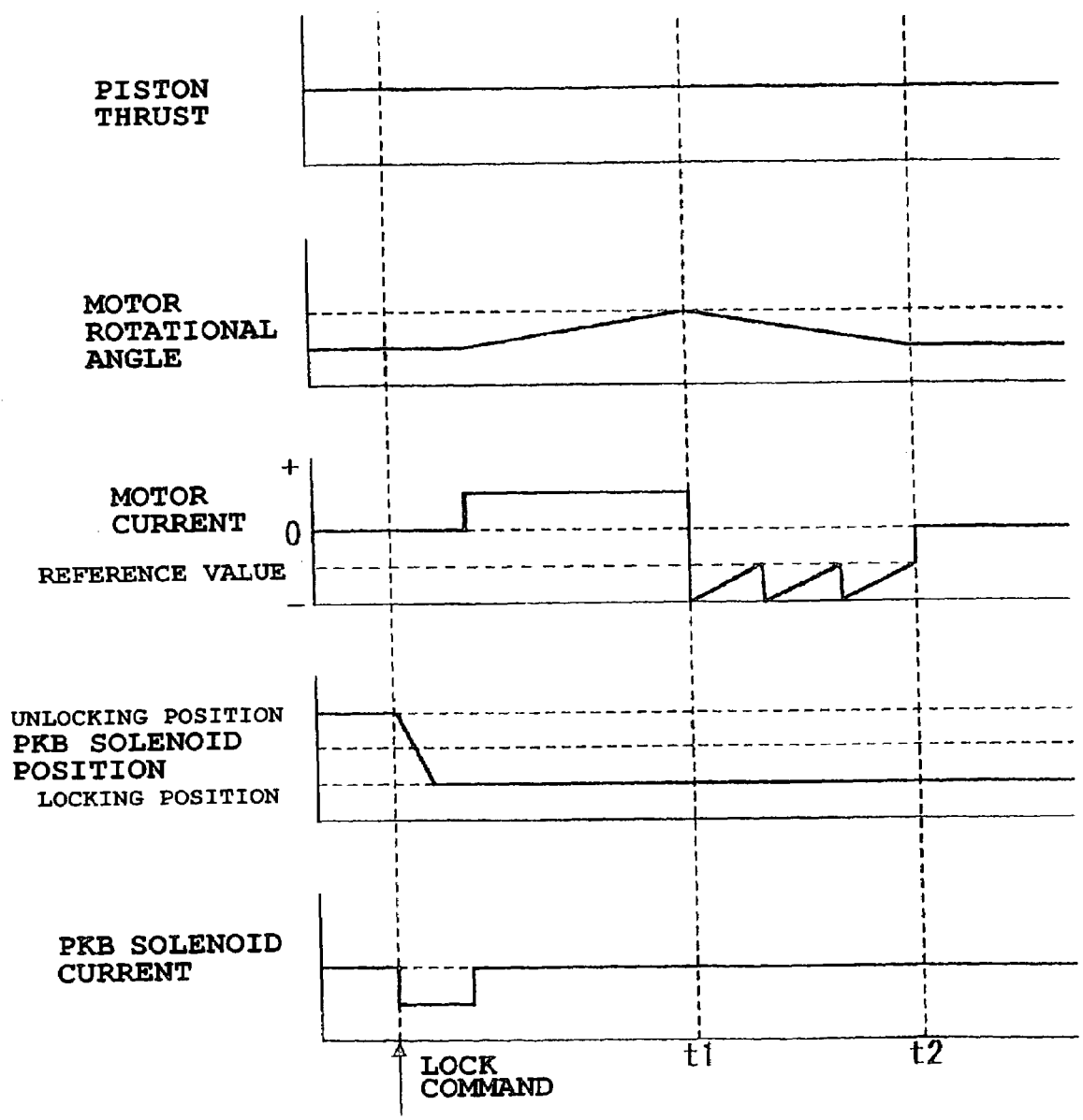
FIG. 18 is a time chart showing operational timing when the locking operation is found to be normal in FIG. 15.
Figure 19:
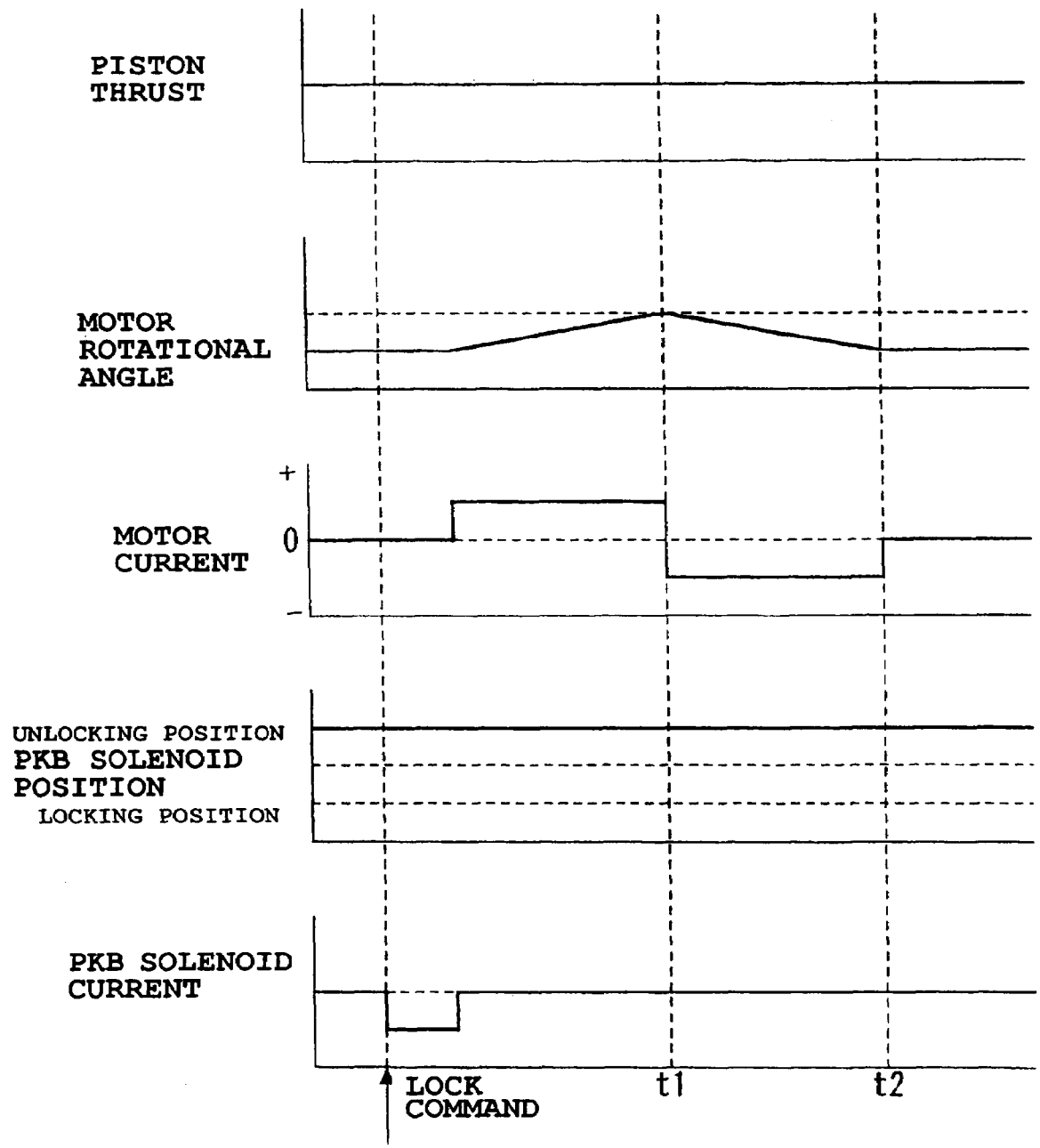
FIG. 19 is a time chart showing operational timing when the locking operation is found to be irregular in FIG. 15.

As shown in FIGS. 15, 18, and 19, in the subroutine of step S3 (a locking operation check), first a locking direction current is caused to flow into the solenoid 51 for a prescribed period of time (approximately 10 ms) in order to transmit a lock command to cause the locking mechanism 50 to enter a locked state (step S31). Next, a positive rotation direction (+) current (motor current) is caused to flow into the motor 12, causing the motor 12 to rotate positively (in other words, such that the rotational angle of the motor becomes gradually larger) within a range at which thrust (piston thrust) is not generated in the piston 11 (step S32), and then, a reverse rotation direction (−) current (motor current) is caused to flow into the motor 12 to cause the motor 12 to rotate in reverse (in other words, such that the rotational angle of the motor becomes gradually smaller) (step S33).

Following step S33, the current flowing into the motor 12 to cause the motor 12 to rotate in reverse is detected by the current sensor 104, and a determination is made as to whether or not the detected value is larger than the predetermined reference value (step S34). Step S34 constitutes the operating condition detection means.

If the locking operation of the locking mechanism 50 is performed normally in response to the lock command issued in step S31, the current detected by the current sensor 104, or in other words the current (motor current) flowing into the motor 12, takes a large value, and hence, as shown in FIG. 18, a current exceeding the aforementioned reference value is caused to flow, a positive determination is made in step S34, processing for a normal locking operation is performed (step S36), and the process then returns to the flowchart in FIG. 13.

If, on the other hand, the locking operation of the locking mechanism 50 is not performed normally in response to the lock command issued in step S31 (that is, when the locking mechanism 50 is in an unlocked state), the motor current does not take a large value, and equals or falls below the reference value, as shown in FIG. 19. Hence in this case, a negative determination is made in step S34, processing for an abnormal locking operation is performed (step S35), and the process then returns to the flowchart in FIG. 13.

Note that when a positive determination is made in step S34 (that is, when the motor current is not large, or in other words the locking operation is abnormal), the period of time during which a current is applied to the solenoid 51 may be increased in order to repeat the check, and checking of the locking operation may be repeated several times.

(4) [Checking of the Locking Operation following a Parking Brake Operation]

Figure 20:
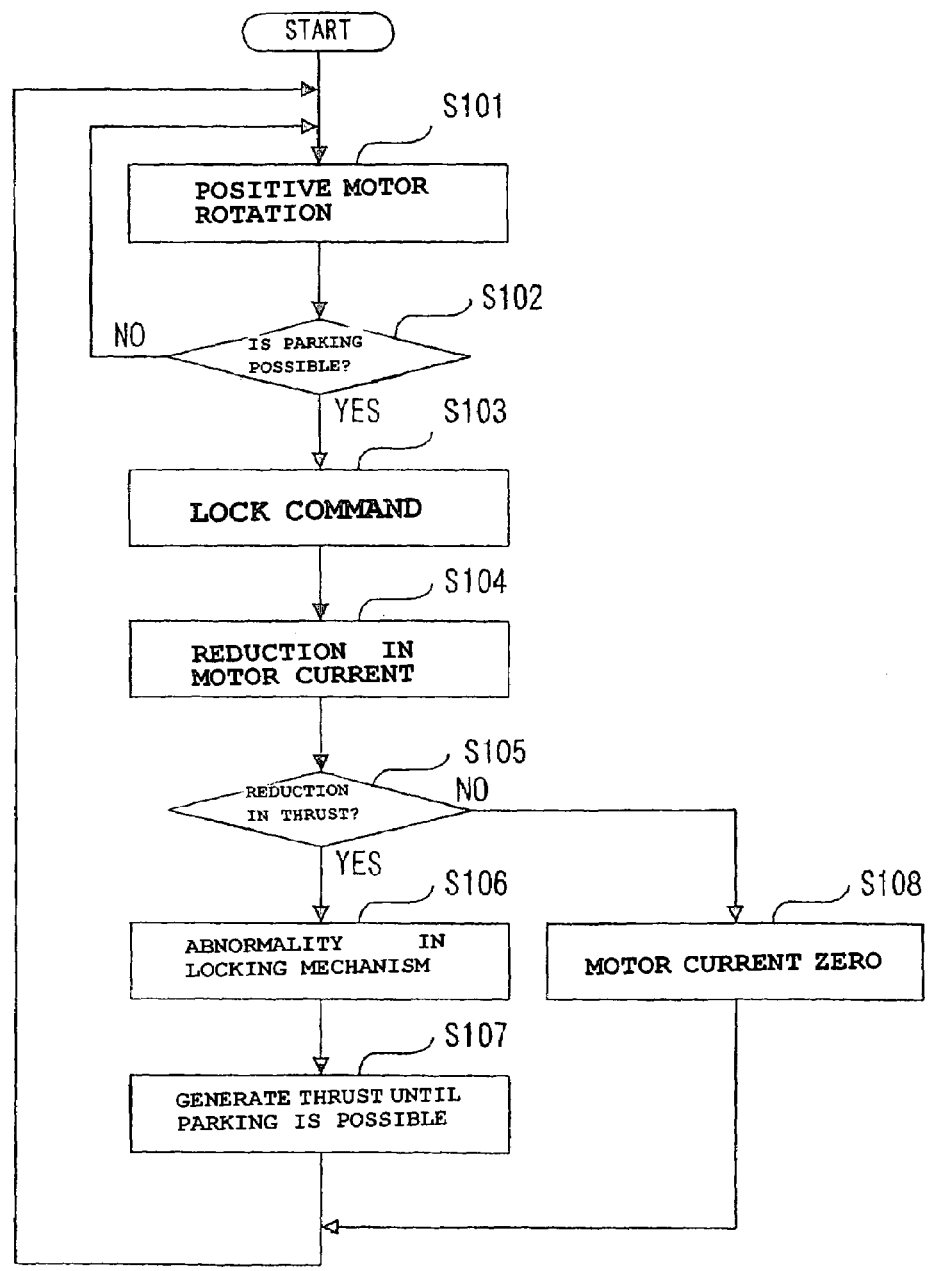
FIG. 20 is a flowchart showing an operation to check operation of the parking brake in the electric disc brake apparatus.
Figure 21:
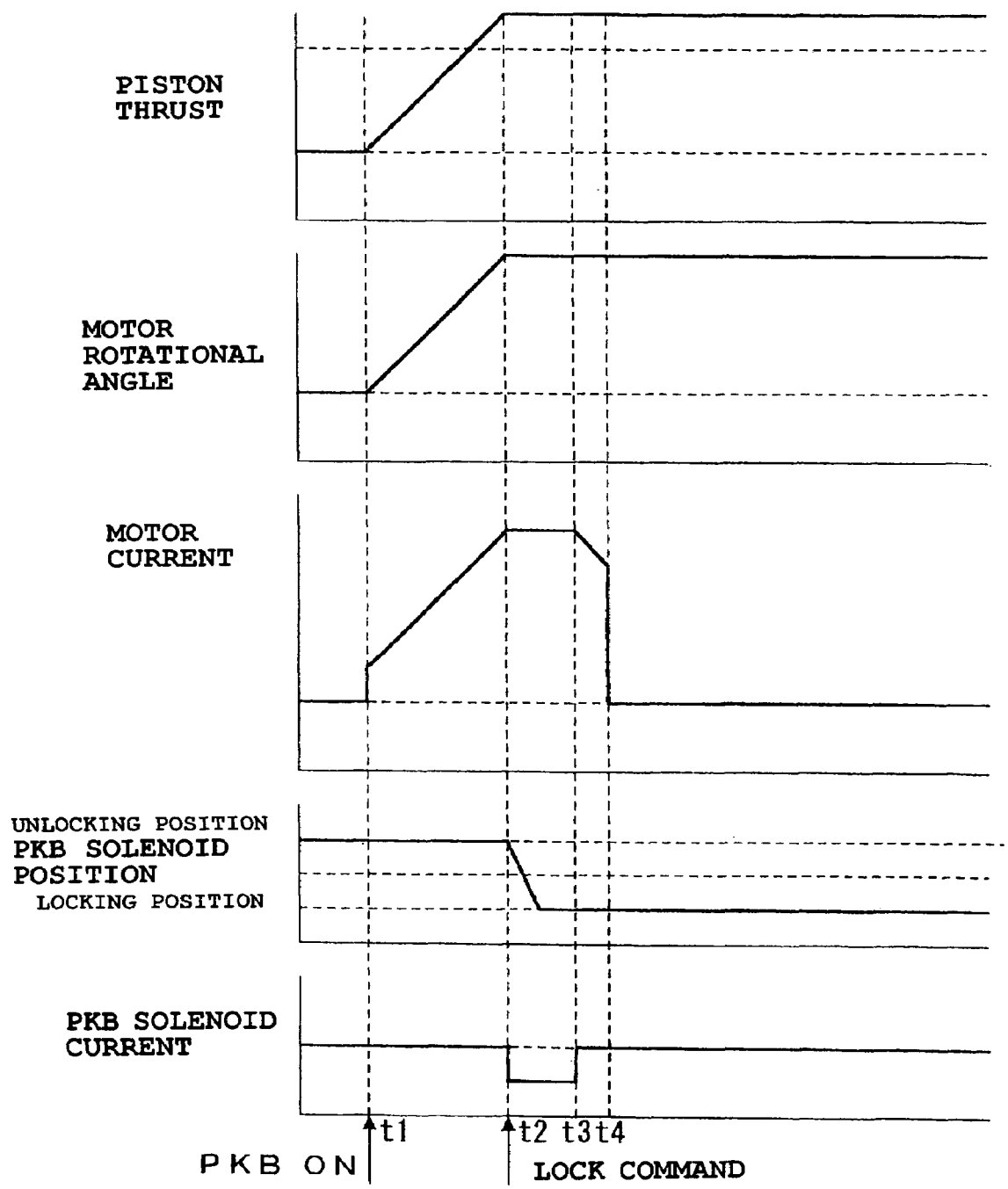
FIG. 21 is a time chart showing operational timing when the locking operation is found to be normal in FIG. 20.
Figure 22:
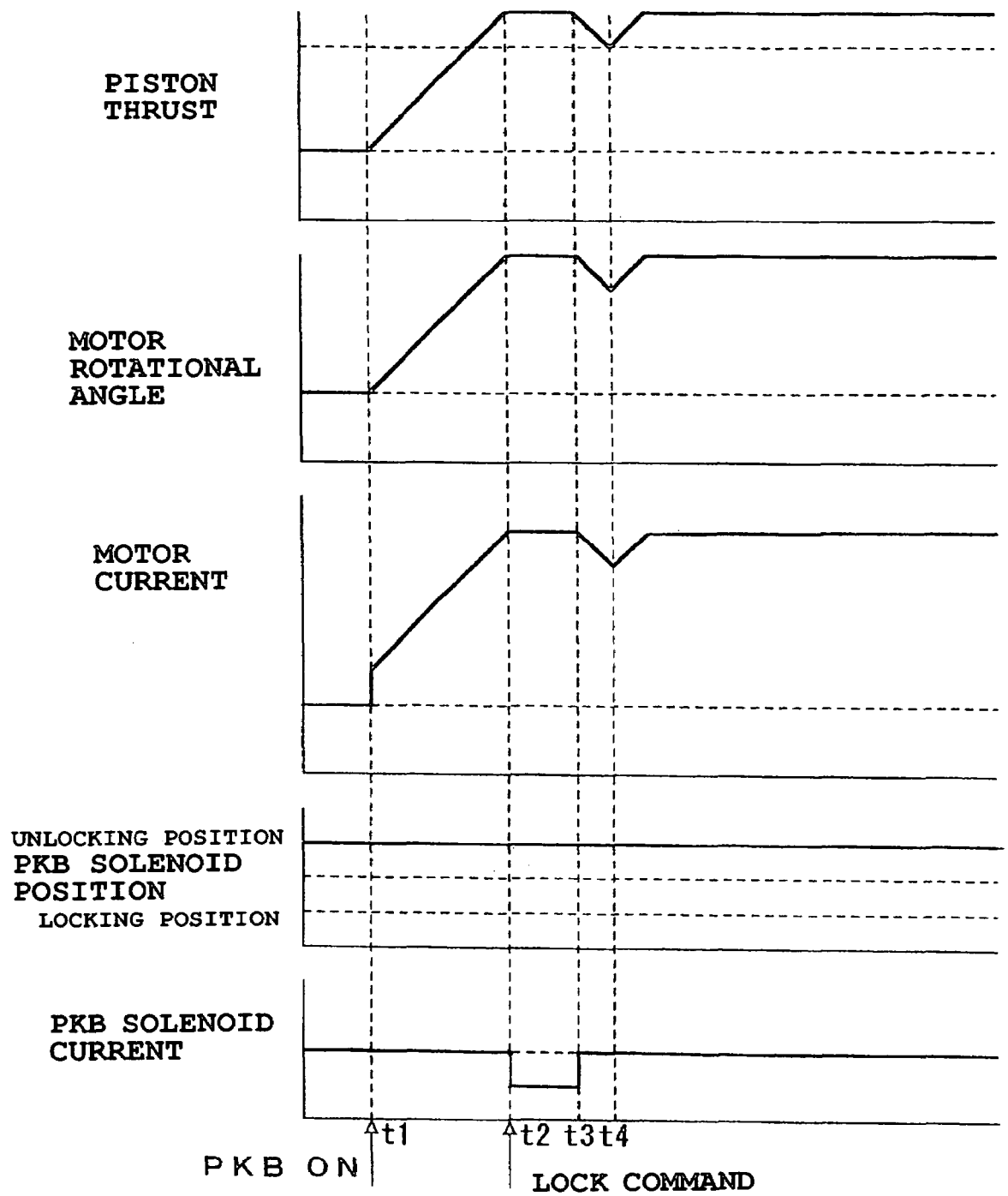
FIG. 22 is a time chart showing operational timing when the locking operation is found to be irregular in FIG. 20.

Parking braking is generally performed when the vehicle is stationary, and hence in this embodiment, the locking operation following a parking brake operation is checked as shown in FIGS. 20 through 22.

First, as shown in FIGS. 20 through 22, when the parking brake (PKB) is switched ON and the parking brake on/off switch 106 outputs an ON signal (time t1), a current (motor current) in a direction for generating thrust (a positive direction) is caused to flow into the motor 12, whereby the motor 12 rotates positively (step S101). Then, a determination is made on the basis of the rotational angle of the motor 12 (motor rotational angle) as to whether or not the thrust generated upon rotation of the motor 12 is of a sufficient magnitude to enable parking (step S102). If the determination in step S102 is negative, the process returns to step S101. If the determination in step S102 is positive, a lock command is issued (time t2), thereby causing the solenoid 51 to operate (time t2-t3) and locking the locking mechanism 50 (step S103).

Following step S103, the motor current is reduced to cause the motor 12 to rotate in reverse (step S104), whereupon a determination is made as to whether or not the thrust has decreased (step S105). Step S105 constitutes the operating condition detection means.

If the locking operation of the locking mechanism 50 is performed normally in response to the lock command issued in step S103, the motor 12 does not rotate in reverse (the motor rotational angle does not change) even when the motor current is reduced to cause the motor 12 to rotate in reverse (step S104, time t3-t4), as shown in FIG. 21, and hence a negative determination is made in step S105 (indicating that the thrust has not decreased). Then, as shown in FIG. 21, the motor current is reduced to zero (step S108), whereupon the process returns to step If, on the other hand, the locking operation of the locking mechanism 50 is not performed normally in response to the lock command issued in step S103 (in other words, if the locking mechanism 50 is in an unlocked state), the current reduction of step S104 (time t3-t4) causes the motor 12 to rotate in reverse, whereby the motor rotational angle decreases as shown in FIG. 22. Accompanying this decrease, the piston thrust falls, causing a positive determination to be made in step S105 (indicating that the thrust has decreased). Accordingly, to indicate an abnormality in the locking mechanism, the warning light 108 is caused to flash and a warning sound is emitted from the speaker 107, informing the driver of an abnormality in the parking brake (step S106). Following step S106, the motor current is raised again to generate sufficient thrust to enable parking (step S107), whereupon the process returns to step S101.

Note that when a positive determination is made in step S105 (indicating a reduction in thrust, or in other words an abnormality in the locking mechanism), the period of time during which a current is applied to the solenoid 51 may be increased in order to repeat the check, and checking of the locking operation may be repeated several times.

(5) [Unlocking Operation Checking during Parking Brake Release]

Figure 23:
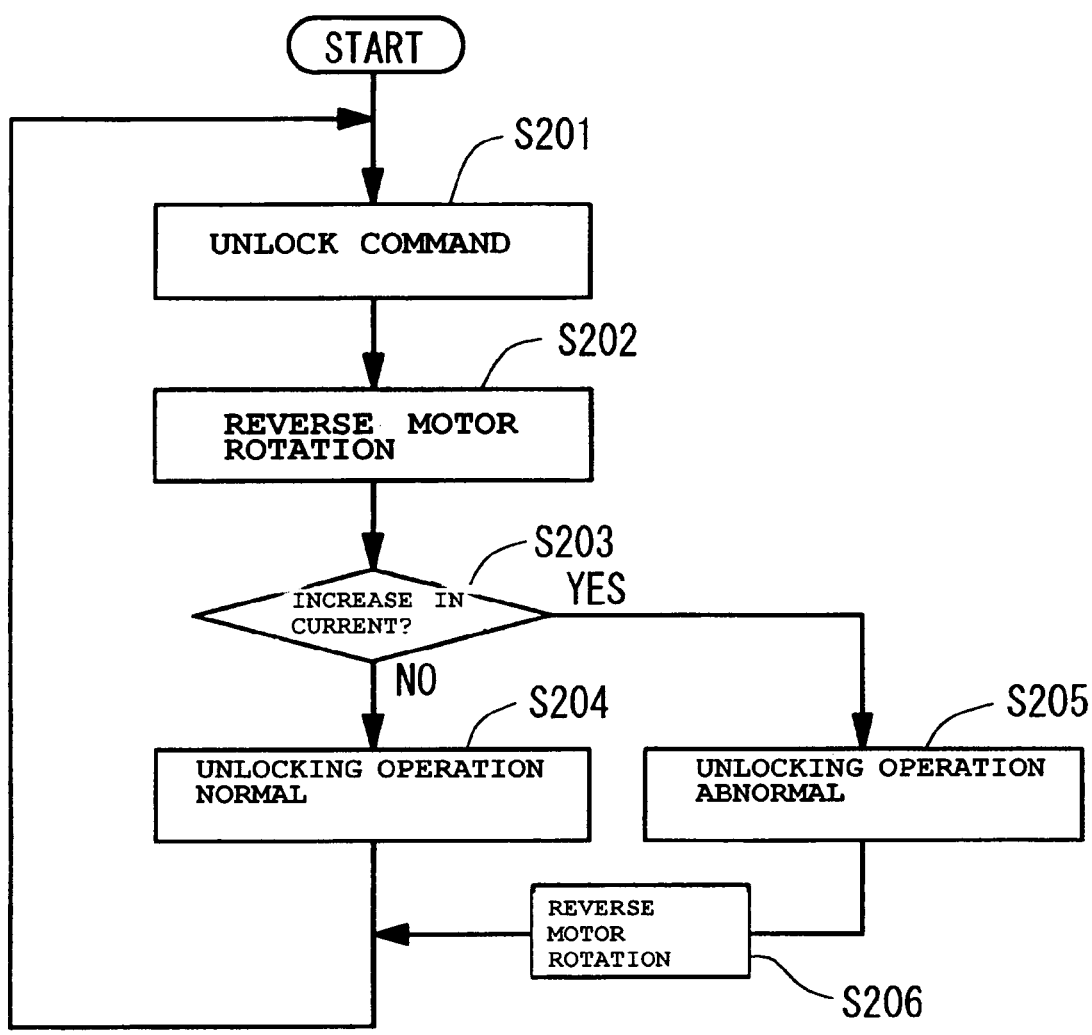
FIG. 23 is a flowchart showing an operation to check parking brake release in the electric disc brake apparatus.

Checking of the unlocking operation during parking brake release is performed in the following manner. First, as shown in FIGS. 23 through 25, the parking brake (PKB), and hence the parking brake on/off switch 106, output an OFF signal (time t1), whereupon a current (motor current) in a direction causing reverse rotation (−) is caused to flow into the motor 12 (time t2-t3) such that the motor 12 rotates in an opposite direction to the direction in which piston thrust increases (in other words, reverse rotation) (step S202).

Then, on the basis of the rotational angle of the motor 12 (the motor rotational angle), a reduction in piston thrust accompanying the reverse rotation of the motor 12 is confirmed, and a determination is made as to whether or not the motor current at this time has increased (is larger than the reference value) (step S203). Step S203 constitutes the operating condition detection means.

Figure 24:
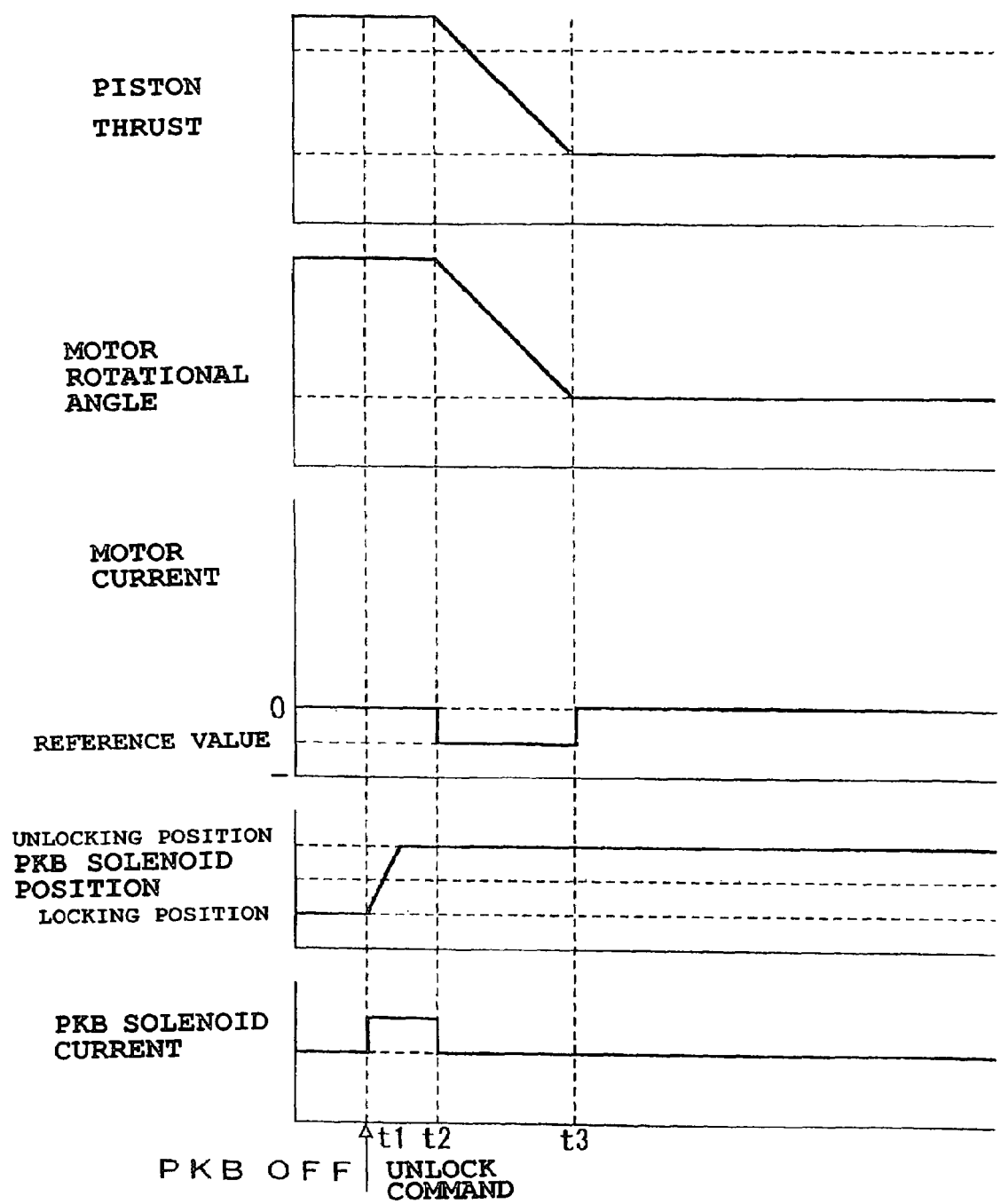
FIG. 24 is a time chart showing operational timing when the unlocking operation of the locking mechanism during parking brake release is found to be normal in FIG. 23.
Figure 25:
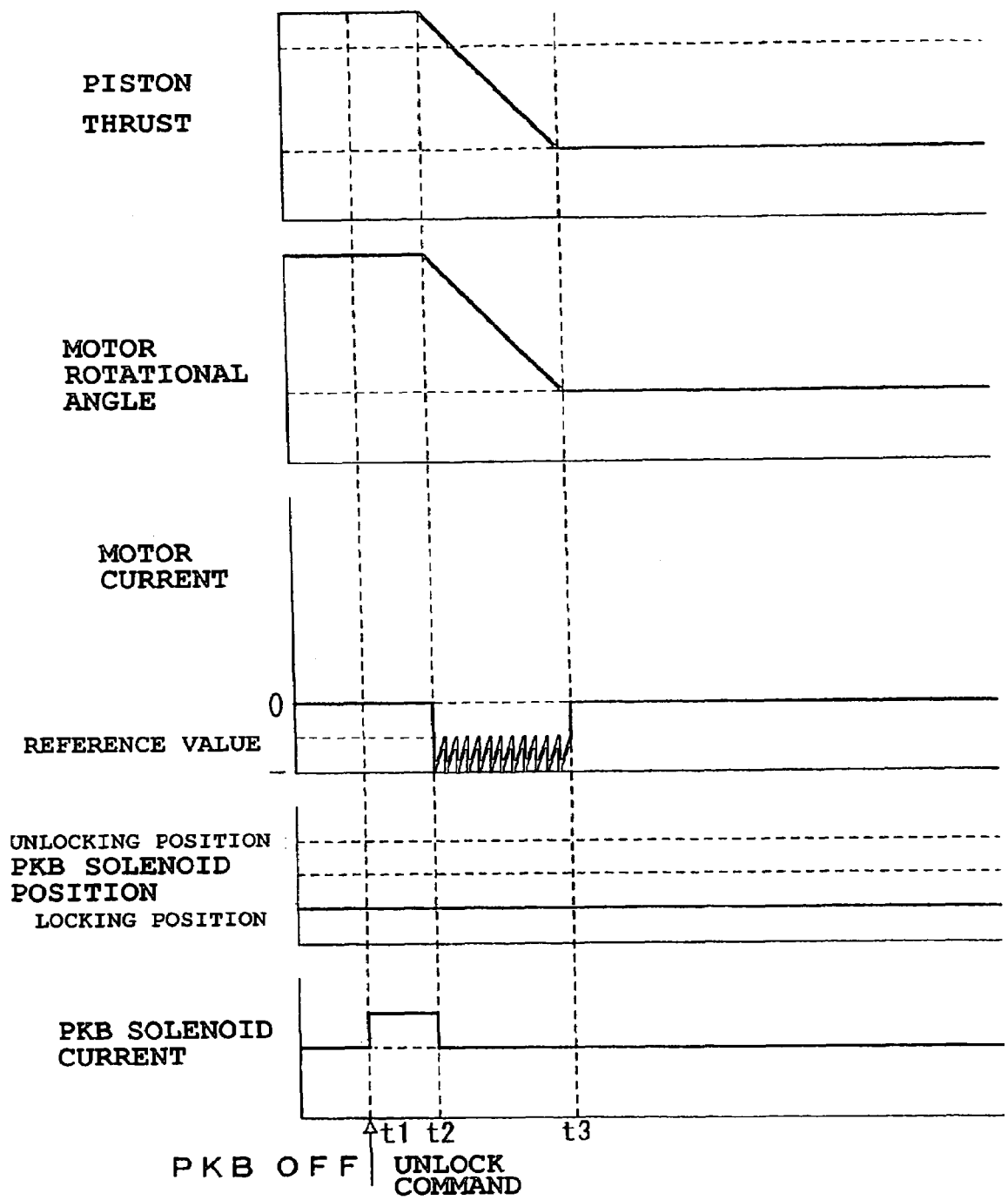
FIG. 25 is a time chart showing operational timing when the unlocking operation of the locking mechanism during parking brake release is found to be irregular in FIG. 23.

If the locking mechanism 50 enters an unlocked state in response to the unlock command issued in step S201, the motor 12 is caused to rotate in reverse by the current supply in step S202 without producing a large increase in load, and hence the motor current does not increase as shown in FIG. 24. Thus a negative determination is made in S203, and processing upon determination of a normal unlocking operation is performed, whereupon the process returns to step S201.

If, on the other hand, the locking mechanism 50 does not perform an unlocking operation normally in response to the unlock command issued in step S201 (in other words, if the locking mechanism 50 is in a locked state), the claw wheel 52 must negotiate the engaging claw 56 as the motor 12 rotates in reverse. As a result, a large load is placed on the motor 12, and thus a correspondingly large current is passed through the motor 12, causing the motor current to increase as shown in FIG. 25 (current increase). Accordingly, a positive determination is made in step S203 (indicating a current increase), and in order to indicate an abnormality in the unlocking operation, the warning light 108 is caused to flash and a warning sound is emitted from the speaker 107, informing the driver of an abnormality in the parking brake (step S205). Following step S205, the motor 12 is rotated in reverse to reduce the piston thrust to zero, whereupon the process returns to step S201.

Note that when a positive determination (of an abnormality in the unlocking operation) is made in step S203, the period of time during which a current is applied to the solenoid 51 may be increased in order to repeat the check, and checking of the locking operation may be repeated several times.

The control described above is assumed to be performed by the controller 100, but by connecting the current sensor 104 to the driver circuit 103, this control may be performed by the driver circuit 103.

In the electric disc brake apparatus constituted as described above, the controller 100 detects operation of the solenoid 51 which drives the parking brake locking mechanism (holding mechanism) 16, and hence a state in which thrust generated by the motor (first electric actuator) 12 is maintained by the parking brake locking mechanism 16, and accordingly the operative and inoperative states of the parking brake, can be understood easily. Further, detection of the current flowing through the motor 12 is performed by the current sensor 104, which is also used to realize a function of the motor 12 (a function of moving the brake pads toward the disc rotor), and hence separate current detection means need not be provided to detect the current value of the motor 12. Accordingly, the operative and inoperative states of the parking brake can be understood by means of a simple constitution, and the apparatus can be reduced in cost.

Further, operation of the parking brake locking mechanism 16 can be checked prior to use of the parking brake, and hence breakdowns in the parking brake locking mechanism 16 can be detected in advance. In this embodiment, the driver is notified of a breakdown in the parking brake locking mechanism 16 through the speaker 107 and warning light 108, enabling measures to be taken appropriately at the time of such a breakdown.

Moreover, operations of the parking brake locking mechanism 16 are checked upon use of the parking brake, and hence the functions of the parking brake can be reliably exhibited.

According to the electric disc brake apparatus of the present invention, operating condition detection means detect the operating condition of a second electric actuator for driving a holding mechanism using a current value of a first electric actuator, and hence a state in which thrust generated by the first electric actuator is maintained by the holding mechanism, and therefore the operative and inoperative states of a parking brake, can be understood easily, enabling notification of an abnormality in the parking brake, and thus an improvement in the reliability of the electric disc brake apparatus.

What is the claimed is:

1. An electric disc brake apparatus comprising:
a caliper comprising a piston that pushes a pair of brake pads opposing each other on either side of a disc rotor toward the disc rotor, a motor that moves the piston via a rotation-linear movement conversion mechanism, the motor being operated by an electric current, a claw wheel provided to rotate along with rotation of the motor, an engaging claw disposed on the outer periphery of the claw wheel so as to engage with or separate from the claw wheel, and an actuator that causes the engaging claw to engage with or separate from the claw wheel, wherein the claw wheel, the engaging claw and the actuator constitute a holding mechanism for a parking brake which maintains thrust of the piston generated by the motor;
a controller that controls the motor and the actuator; and
an electric current sensor that detects the electric current flowing through the motor,
wherein the controller comprises an operating condition detector which diagnoses operating conditions of the holding mechanism, and the operating condition detector determines, after the controller transmits a command for releasing the engaging claw from the claw wheel, that release of the engaging claw from the claw wheel has failed, if the current value from the electric current sensor, which is detected when the motor is operated to reduce the thrust of the piston, exceeds a predetermined reference value.

2. An electric disc brake apparatus according to claim 1, wherein the operating condition detector determines that release of the engaging claw from the claw wheel has failed, under a condition that there is a pad clearance between the piston and the brake pads.

3. An electric disc brake apparatus according to claim 2, wherein the motor rotates in a direction to move the piston to generate the thrust and rotates in the other direction to move the piston opposite to generating the thrust, and
the operating condition detector determines that release of the engaging claw from the claw wheel has failed, after the motor is controlled in such a way that it rotates in the direction and stops before generating the thrust and rotates in the other direction.

4. An electric disc brake apparatus according to claim 1, wherein the operating condition detector determines that release of the engaging claw from the claw wheel has failed, when the parking brake is released.

5. An electric disc brake apparatus according to claim 1, wherein the command activates the actuator to release the engaging claw from the claw wheel.

6. An electric disc brake apparatus comprising:
a caliper comprising a piston that pushes a pair of brake pads opposing each other on either side of a disc rotor toward the disc rotor, a motor that moves the piston via a rotation-linear movement conversion mechanism, the motor being operated by an electric current, a claw wheel provided to rotate along with rotation of the motor, an engaging claw disposed on the outer periphery of the claw wheel so as to engage with or separate from the claw wheel, and an actuator that causes the engaging claw to engage with or separate from the claw wheel, wherein the claw wheel, the engaging claw and the actuator constitute a holding mechanism for a parking brake which maintains thrust of the piston generated by the motor;
a controller that controls the motor and the actuator; and
an electric current sensor that detects the electric current flowing through the motor,
wherein the controller comprises an operating condition detector which diagnoses operating conditions of the holding mechanism, and the operating condition detector determines, after the controller transmits a command for engaging the engaging claw with the claw wheel, that engagement of the engaging claw with the claw wheel has failed, if the current value from the electric current sensor, which is detected when the motor is operated to reduce the thrust of the piston, is lower than a predetermined reference value.

7. An electric disc brake apparatus according to claim 6, wherein the operating condition detector determines that engagement of the engaging claw with the claw wheel has failed, under a condition that there is a pad clearance between the piston and the brake pads.

8. An electric disc brake apparatus according to claim 7, wherein the motor rotates in a direction to move the piston to generate the thrust and rotates in the other direction to move the piston opposite to generating the thrust, and the operating condition detector determines that engagement of the engaging claw with the claw wheel has failed, after the motor is controlled in such a way that it rotates in the direction and stops before generating the thrust and rotates in the other direction.

9. An electric disc brake apparatus according to 6, wherein the command activates the actuator to engage the engaging claw with the claw wheel.

10. An electric disc brake apparatus comprising:

a caliper comprising a piston that pushes a pair of brake pads opposing each other on either side of a disc rotor toward the disc rotor, a motor that moves the piston via a rotation-linear movement conversion mechanism, a claw wheel provided to rotate along with rotation of the motor, an engaging claw disposed on the outer periphery of the claw wheel so as to engage with or separate from the claw wheel, and an actuator that causes the engaging claw to engage with or separate from the claw wheel, wherein the claw wheel, the engaging claw and the actuator constitute a holding mechanism for a parking brake which maintains thrust of the piston generated by the motor;

a controller that controls the motor and the actuator; and a detector that detects a rotational position of the motor, wherein the controller comprises an operating condition detector which diagnoses operating conditions of the holding mechanism, and the operating condition detector determines that engagement of the engaging claw with the claw wheel has failed, based on a rotation of the motor detected by the detector after the controller transmits a command for engaging the engaging claw with the claw wheel.

11. An electric disc brake apparatus according to claim 10, wherein the operating condition detector determines that engagement of the engaging claw with the claw wheel has failed, based on a rotation of the motor detected by the detector after the controller transmits the command when the motor rotates in a direction to move the piston to generate the thrust in order to effect the parking brake and thereafter lowers electric current supplied to the motor.

12. An electric disc brake apparatus according to claim 10, wherein the operating condition detector determines, after the controller transmits the command for engaging the engaging claw with the claw wheel, that engagement of the engaging claw with the claw wheel has failed, if the detector detects a rotation of the motor in a direction for reducing the thrust of the piston.

13. An electric disc brake apparatus according to claim 10, wherein the command activates the actuator to engage the engaging claw with the claw wheel.

* * * * *